US012528824B2

(12) United States Patent
Rasmussen

(10) Patent No.: US 12,528,824 B2
(45) Date of Patent: Jan. 20, 2026

(54) BIOTIN-CONTAINING MONOMERS AND ARTICLES FORMED THEREFROM

(71) Applicant: Solventum Intellectual Properties Company, Maplewood, MN (US)

(72) Inventor: Jerald K. Rasmussen, Woodville, WI (US)

(73) Assignee: THERMO FISHER BIOPROCESSING INC., Waltham, MA (US)

( * ) Notice: Subject to any disclaimer, the term of this patent is extended or adjusted under 35 U.S.C. 154(b) by 911 days.

(21) Appl. No.: 17/755,946

(22) PCT Filed: Nov. 23, 2020

(86) PCT No.: PCT/IB2020/061018
§ 371 (c)(1),
(2) Date: May 12, 2022

(87) PCT Pub. No.: WO2021/105843
PCT Pub. Date: Jun. 3, 2021

(65) Prior Publication Data
US 2022/0396584 A1    Dec. 15, 2022

Related U.S. Application Data

(60) Provisional application No. 62/939,760, filed on Nov. 25, 2019.

(51) Int. Cl.
| *C07D 495/04* | (2006.01) |
| *B01D 69/10* | (2006.01) |
| *B01D 71/66* | (2006.01) |
| *C08F 20/60* | (2006.01) |
| *C09D 133/26* | (2006.01) |

(52) U.S. Cl.
CPC .......... *C07D 495/04* (2013.01); *B01D 69/10* (2013.01); *B01D 71/66* (2013.01); *C08F 20/60* (2013.01); *C09D 133/26* (2013.01)

(58) Field of Classification Search
None
See application file for complete search history.

(56) References Cited

U.S. PATENT DOCUMENTS

| 3,876,738 A | 4/1975 | Marinaccio et al. |
| 3,928,517 A | 12/1975 | Knight et al. |
| 4,539,256 A | 9/1985 | Shipman |
| 4,707,265 A | 11/1987 | Barnes, Jr. et al. |
| 4,726,989 A | 2/1988 | Mrozinski |
| 4,867,881 A | 9/1989 | Kinzer |
| 5,120,594 A | 6/1992 | Mrozinski |
| 5,260,360 A | 11/1993 | Mrozinski et al. |
| 5,458,782 A | 10/1995 | Hou et al. |
| 5,506,279 A | 4/1996 | Babu et al. |
| 5,962,544 A | 10/1999 | Waller, Jr. |
| 6,056,529 A | 5/2000 | Meyering et al. |
| 6,267,916 B1 | 7/2001 | Meyering et al. |
| 6,413,070 B1 | 7/2002 | Meyering et al. |
| 6,776,940 B2 | 8/2004 | Meyering et al. |
| 7,052,917 B1 | 5/2006 | Ohnishi et al. |
| 7,098,253 B2 | 8/2006 | Rasmussen et al. |
| 7,125,603 B2 | 10/2006 | David et al. |
| 7,195,925 B2 | 3/2007 | Ohnishi et al. |
| 7,338,692 B2 | 3/2008 | Smith et al. |
| 7,647,836 B2 | 1/2010 | O'Brien et al. |
| 7,674,835 B2 | 3/2010 | Rasmussen et al. |
| 7,683,100 B2 | 3/2010 | Rasmussen et al. |
| 8,343,727 B2 | 1/2013 | Takakura et al. |
| 8,795,782 B2 | 8/2014 | Meagher et al. |
| 9,175,036 B2 | 11/2015 | Kasher et al. |
| 9,376,463 B2 | 6/2016 | Kyhse-Andersen |
| 9,616,394 B2 | 4/2017 | Bothof et al. |
| 10,039,856 B2 | 8/2018 | Rasmussen et al. |
| 2011/0100916 A1 | 5/2011 | Shannon et al. |
| 2012/0064543 A1 | 3/2012 | Takakura et al. |
| 2012/0252091 A1 | 10/2012 | Rasmussen et al. |

FOREIGN PATENT DOCUMENTS

| EP | 0390910 B1 | 12/1995 |
| EP | 0295073 B1 | 3/1997 |
| EP | 1201667 A1 | 5/2002 |
| EP | 2220107 B1 | 11/2016 |
| WO | 2009004106 A1 | 1/2009 |

(Continued)

OTHER PUBLICATIONS

International Search Report for PCT Application No. PCT/IB2020/061018, mailed on Feb. 25, 2021, 4 pages.
Jiang, "Biotin-Functionalized Poly(Ethylene Terephthalate) Capillary-channeled Polymer Fibers as HPLC Stationary Phase for Affinity Chromatography", Analytical and Bioanalytical Chemistry, vol. 407, 2015, pp. 939-951.
MFCD00163072, Sigma-Aldrich®, "Biotin-Agarose", 2020, 2 pages.
Sundberg, "Spatially-Addressable Immobilization of Macromolecules on Solid Supports", Journal of the American Chemical Society, vol. 117, 1995, pp. 12050-12057.
Tao, "Bioconjugation of Biotinylated PAMAM Dendrons to Avidin", Chemical Communications, 2007, pp. 3441-3443.
Thermo Scientific, "Avidin-Biotin Technical Handbook", 2009, pp. 1-48.

(Continued)

*Primary Examiner* — Samantha L Shterengarts
(74) *Attorney, Agent, or Firm* — HYLTON-RODIC LAW PLLC

(57) ABSTRACT

Biotin-containing monomers, polymeric materials formed from the biotin-containing monomers, articles containing the polymeric materials, methods of making the articles, and methods of using the articles are provided. The articles can be used, for example, for affinity capture of biotin-binding proteins, including biotin-binding fusion proteins (i.e., a biotin-binding protein fused to another biomaterial). Articles that contain captured biotin-binding proteins can be further used for affinity capture of various biotin-containing biomaterials such as biotinylated proteins. The articles can also be used, for example, for affinity capture of biotin-binding fusion proteins where the fusion protein includes, for example, an enzyme or antibody.

17 Claims, 1 Drawing Sheet

(56) References Cited

FOREIGN PATENT DOCUMENTS

| | | |
|---|---|---|
| WO | 2014052215 A1 | 4/2014 |
| WO | 2015050767 A1 | 4/2015 |
| WO | 2015200131 A1 | 12/2015 |
| WO | 2018048696 A1 | 3/2018 |
| WO | 2018048698 A1 | 3/2018 |
| WO | 2020127311 A1 | 6/2020 |

OTHER PUBLICATIONS

Wente, "Manufacture of Superfine Organic Fibers," Naval Research Laboratories Report No. 4364, 1954, 24 pages.

Wente, "Superfine Thermoplastic Fibers", Industrial & Engineering Chemistry, 1956, vol. 48, No. 8, pp. 1342-1346.

BIOTIN-CONTAINING MONOMERS AND ARTICLES FORMED THEREFROM

CROSS REFERENCE TO RELATED APPLICATIONS

This application is a national stage filing under 35 U.S.C. 371 of PCT/IB2020/061018, filed Nov. 23, 2020, which claims the benefit of U.S. Provisional Patent Application No. 62/939,760, filed Nov. 25, 2019, the disclosure of which is incorporated by reference in its/their entirety herein.

BACKGROUND

Biotin is known to interact strongly, even irreversibly, with proteins such as avidin, streptavidin, and tamavidin. For example, the dissociation constant ($K_d$) can be in a range of $10^{-14}$ to $10^{-15}$ moles/liter. Biotinylated proteins or biotin-binding proteins of interest can be isolated from a sample because of this highly stable interaction. Biotin has been attached to various chromatography resins for isolation of biotin-binding proteins from other biological materials. The resulting chromatography resins with bound proteins (e.g., bound biotin-binding proteins such as avidin, streptavidin, and tamavidin) can then be further used to capture and/or remove biotinylated biological materials from various samples. This provides researchers with a powerful tool for immunoassays, receptor studies, immunocytochemical staining, and protein isolation.

One problem with biotinylated chromatography resins, especially for isolation of biological macromolecules such as biotin-binding proteins, is that the interaction between the biotin-containing group on the chromatography resin and the biotin-binding protein is diffusion limited because a large percentage of the biotin-containing groups are located within the interior structure of the porous resin. This results in the need for long residence times (i.e., long exposure times) to capture the target biotin-binding proteins.

Diffusion limitations can be mitigated to a large extent by binding the biotin molecule to a porous sheet-like substrate, such as a membrane or nonwoven. This can be accomplished, for example, by selecting a substrate that has functional groups available that can be used for conjugation with the biotin molecule. Alternatively, the substrate can be subjected to chemical activation to provide these functional groups. Subsequently, the biotin molecule must be coupled to the substrate. This can be accomplished using a variety of conjugation/activation chemistries that are well-known in the art, or it can be accomplished by using a "biotinylation agent" that is known in the art. An alternative approach is to biotinylate a synthetic or biological macromolecule (e.g., protein, enzyme, antibody, antigen, nucleic acid, and the like) and then irreversibly attach that biotinylated macromolecule to the support. These approaches, however, are typically multistep reactions involving expensive reagents and are not amenable to scale-up or roll-to-roll processing.

SUMMARY

Biotin-containing monomers, polymeric materials having monomeric units derived from biotin-containing monomers, articles containing the polymeric materials, methods of making the articles, and methods of using the articles are provided. The articles can be used, for example, for affinity capture and separation of biotin-binding proteins from other biological macromolecules.

In a first aspect, a polymeric material is provided that contains monomeric units derived from the biotin-containing monomer of Formula (I) in an amount ranging from 1 to 100 mole percent of based on total moles of monomeric units in the polymeric material.

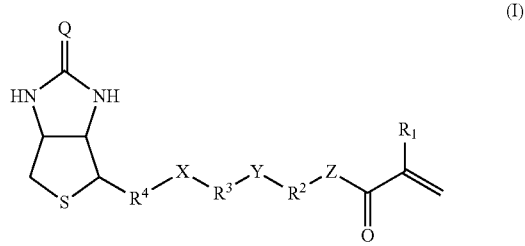

In Formula (I), group Q is oxygen or NH, group X is —(CO)—O— or —(CO)—NH—, group Y is —NH—(CO)—, —NH—(CO)—NH—, —O—(CO)—NH—, or —O—(CO)—, and group Z is —O— or —NH—. Group $R^1$ is hydrogen or methyl and group $R^2$ is an alkylene, an alkylene substituted with an aryl, or a heteroalkylene. Each group $R^3$ and $R^4$ is independently a (hetero)alkylene. If the polymeric material is a homopolymer and Y is equal to —NH—(CO)—, then $R^2$ has greater than 2 carbon atoms.

In a second aspect, an article is provided. The article contains a substrate and a polymeric material disposed on the substrate, wherein the polymeric material is described above in the first aspect. In most embodiments, the polymeric material is irreversibly attached to the substrate.

In a third aspect, a method of making an article is provided. The method includes providing a substrate and forming a polymerizable composition comprising the biotin-containing monomer of Formula (I) in an amount ranging from 1 to 100 mole percent based on total moles of monomeric units in the polymerizable composition.

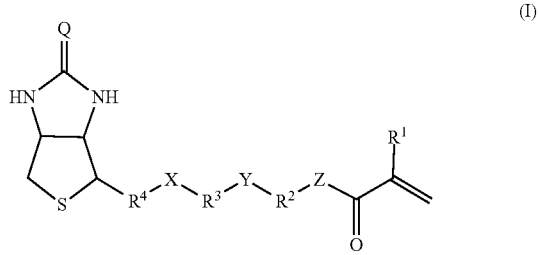

In Formula (I), group Q is oxygen or NH, group X is —(CO)—O— or —(CO)—NH—, group Y is —NH—(CO)—, —NH—(CO)—NH—, —O—(CO)—NH—, or —O—(CO)—, and group Z is —O— or —NH—. Group $R^1$ is hydrogen or methyl and group $R^2$ is an alkylene, an alkylene substituted with an aryl, or a heteroalkylene. Each group $R^3$ and $R^4$ is independently a (hetero)alkylene. The method further includes contacting the substrate with the polymerizable composition and polymerizing the polymerizable composition to form a polymeric material. In many embodiments, the polymerizing step results in irreversible attachment of the polymeric material to the substrate.

In a fourth aspect, a method of separating biotin-binding proteins from other biological materials is provided. The method includes providing an article as described in the second aspect. The method further includes exposing the article to a mixture comprising a biotin-binding protein (including biotin-binding fusion proteins) and non-biotin-binding biological materials such as biological macromolecules. The method yet further includes binding the biotin-binding proteins to the article.

In a fifth aspect, a biotin-containing monomer of Formula (I) is provided.

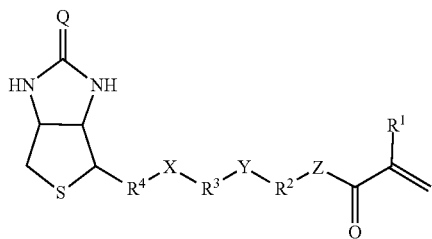

In Formula (I), group Q is oxygen or NH, group X is —(CO)—O— or —(CO)—NH—, group Y is —NH—(CO)—, —NH—(CO)—NH—, —O—(CO)—NH—, or —O—(CO)—, and group Z is —O—. Group $R^1$ is hydrogen or methyl and group $R^2$ is an alkylene, an alkylene substituted with an aryl, or a heteroalkylene. Each group $R^3$ and $R^4$ is independently a (hetero)alkylene. When Y is equal to —NH—(CO)—, the group $R^2$ has greater than two carbon atoms.

DETAILED DESCRIPTION

Figure 1A:
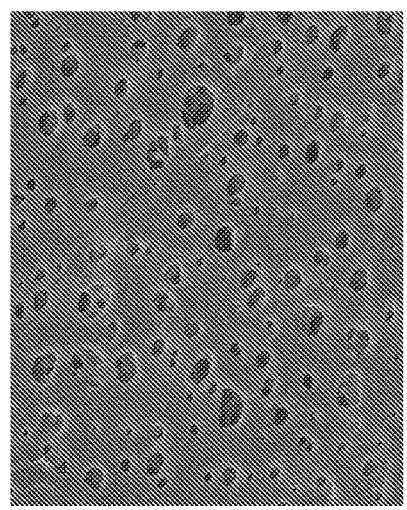
FIG. 1A is a scanning electron micrograph of the article of an unmodified polyether sulfone membrane.

Biotin-containing monomers, polymeric materials formed from the biotin-containing monomers, articles containing the polymeric materials, methods of making the articles, and methods of using the articles are provided. The articles can be used, for example, for affinity capture of biotin-binding proteins, including biotin-binding fusion proteins (i.e., a biotin-binding protein fused to another biomaterial such as another biological macromolecule). Articles that contain captured biotin-binding proteins can be further used for affinity capture of various biotin-containing biomaterials such as biotinylated proteins. The articles can also be used, for example, for affinity capture of biotin-binding fusion proteins where the fusion protein includes, for example, an enzyme or antibody.

The articles contain a substrate and a polymeric material disposed on the substrate. The polymeric material is typically irreversibly attached to the substrate and, in many embodiments, is grafted to the substrate. The polymeric material contains multiple biotin-containing monomeric units. While biotin-containing carriers have been used previously for isolation of biotin-binding proteins, the biotin has not been present in a polymeric material prepared from a biotin-containing monomer. Biotin-containing polymeric materials advantageously have a plurality of biotin-containing monomeric units that can be used for affinity capture of biotin-binding proteins (including biotin-binding fusion proteins) such as avidin, streptavidin, and tamavidin.

The articles can be prepared in a simple, one-step process. Further, the biotin-containing monomeric units included in the polymeric material have a spacer group between the polymeric backbone and the biotin-containing group with enough length to ensure efficient interaction with a biotin-binding protein. It is well known in the art that the biotin-binding sites of biotin-binding proteins are usually located within a pocket below the surface of the protein. Thus, a spacer is needed between the support and the biotin-containing group to achieve effective binding. Further, the biotin-containing polymeric material can be a copolymeric material that optimizes the amount of affinity capture that can occur.

The terms "a", "an", and "the" are used interchangeable and mean one or more.

The term "and/or" refers means one or both. For example, the expression A and/or B means A alone, B alone, or both A and B.

As used herein, "biotin" refers to compounds of Formula (1)

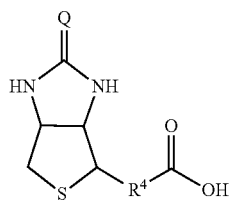

where Q is oxygen or NH and $R^4$ is a (hetero)alkylene. In some embodiments, $R^4$ is an alkylene having 4 carbon atoms and the biotin of Formula (1) is of Formula (1-1).

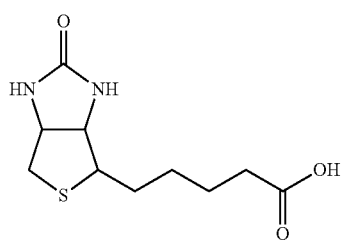

As used herein, the term "biotin group" refers to the compound of Formula (2)

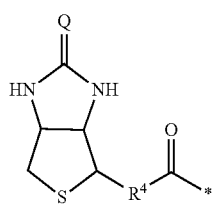

where Q is oxygen or NH, $R^4$ is a (hetero)alkylene and the asterisk (*) is the location of attachment to another group in a compound (e.g., monomer or polymer). In some embodiments, the biotin group of Formula (2) is of Formula (2-1).

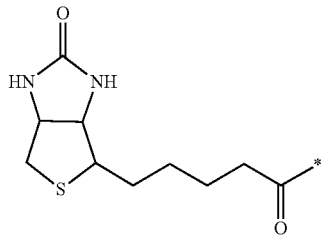
(2-1)

As used herein, the term "biotin-binding protein" refers to a protein that can form a strong bond with a biotin group. Examples of biotin-binding proteins include, but are not limited to, avidin, streptavidin, and tamavidin. The biotin-binding proteins can include fusion proteins that contain, for example, avidin, streptavidin, or tamavidin fused to another biomaterial such as biological macromolecule. In some embodiments, the other biomaterial is an antibody or enzyme.

As used herein, the term "biotinylated" refers to an article or compound (including various compounds of biological interest) that has one or more biotin groups.

The term "biomaterial" refers to materials of biological origin or of biological interest. The biomaterial can be found in nature or a synthetic version or variation of a material found in nature. Biomaterials include, but are not limited to, various biological macromolecules such as proteins, nucleic acids, carbohydrates, enzymes, antibodies, and antigens as well as cell debris and cellular species.

As used herein, the terms "irreversibly bonded" and "irreversibly attached" with reference to a polymeric material and a substrate are used interchangeably to mean that the polymeric material is covalently bonded (e.g., grafted) to the substrate or is physically crosslinked onto the substrate (or intertwined with the substrate) such that, when the composite containing the polymeric material and the substrate is soaked in deionized water for at least 30 minutes, the polymeric material remains firmly attached to the substrate.

As used herein, the terms "polymer" and "polymeric material" are used interchangeably to refer to a compound containing at least three monomeric units. The polymeric material can be a homopolymer, copolymer, terpolymer, and the like. The term "homopolymer" is used to refer to a polymeric material that contains only one type of monomeric units. The term "copolymer" is used to refer to a polymeric material that contains at least 2 different types of monomeric units.

As used herein, the term "monomeric unit" refers to the polymerized product of a monomer having an ethylenically unsaturated group. For example, the monomer methyl acrylate of formula $CH_3$—O—(CO)—CH=$CH_2$ has a monomeric unit of the following formula

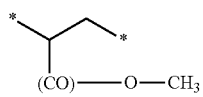

where the asterisk (*) is the location of attachment to another monomeric unit in a polymeric material.

The term "alkylene" refers to a divalent radical of an alkane, which is a saturated hydrocarbon. The alkylene can have up to 20 carbon atoms, up to 16 carbon atoms, up to 12 carbon atoms, up to 10 carbon atoms, up to 6 carbon atoms, or up to 4 carbon atoms. The alkylene can be at least one carbon atom, at least 2 carbon atoms, at least 3 carbon atoms, or at least 4 carbon atoms. The alkylene can be linear, branched, cyclic, or a combination thereof.

The term "heteroalkylene" refers to an alkylene in which one or more of the carbon atoms is replaced with oxygen (i.e., oxy), nitrogen (i.e., —$NR^6$— where $R^6$ is hydrogen, alkyl, or aryl; often $R^6$ is hydrogen), or sulfur (i.e., thio). Each heteroatom is directly attached to two carbon atoms. The heteroalkylene can have up to 20 carbon atoms, up to 16 carbon atoms, up to 12 carbon atoms, up to 10 carbon atoms, up to 6 carbon atoms, or up to 4 carbon atoms and up to 10 heteroatoms, up to 8 heteroatoms, up to 6 heteroatoms, up to 4 heteroatoms, or up to 2 heteroatoms. In many embodiments, the heteroalkylene is of formula —[($C_nH_{2n}$)—O—($C_nH_2$n)]$_x$— where the variable n is 2 or 3 and the variable x is an integer in a range of 1 to 10 or larger, 1 to 8, 1 to 6, 1 to 4, or 1 to 3. The (hetero)alkylene can be linear, branched, cyclic, or a combination thereof.

Monomers

A biotin-containing monomer of Formula (I) is provided.

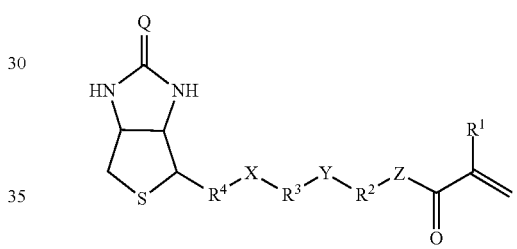
(I)

In Formula (I), group Q is oxygen or NH, group X is —(CO)—O— or —(CO)—NH—, group Y is —NH—(CO)—, —NH—(CO)—NH—, —O—(CO)—NH—, or —O—(CO)—, and group Z is —O— or —NH—. Group $R^1$ is hydrogen or methyl and group $R^2$ is an alkylene, an alkylene substituted with an aryl, or a heteroalkylene. Each group $R^3$ and $R^4$ is independently a (hetero)alkylene. If Y is equal to —NH—(CO)—, the group $R^2$ has greater than two carbon atoms.

In many embodiments, Q is oxygen and the monomer of Formula (I) is of Formula (I-A).

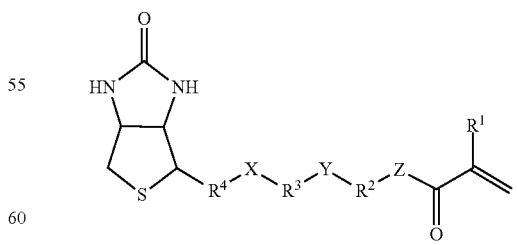
(I-A)

Group $R^4$ in Formula (I) or (I-A) is an alkylene or a heteroalkylene. Group $R^4$ is typically an alkylene. In most embodiments, $R^4$ is an alkylene with four carbon atoms (—$CH_2CH_2CH_2CH_2$—) and the monomer of Formula (I) is of Formula (I-B).

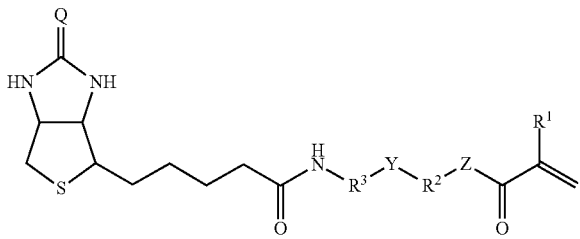

(I-B)

The monomer of Formula (I-B) is often of Formula (I-B-1)

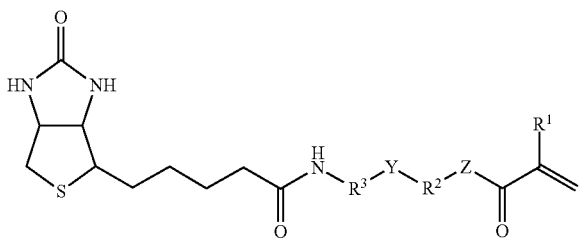

(I-B-1)

where Q is oxygen.

Group $R^3$ in Formulas (I), (I-A), (I-B), and (I-B-1) is an alkylene or heteroalkylene. In many embodiments, $R^3$ is an alkylene having 1 to 10 carbon atoms, 2 to 10 carbon atoms, 1 to 6 carbon atoms, 2 to 6 carbon atoms, 1 to 4 carbon atoms, or 2 to 4 carbon atoms. In some specific embodiments, $R^3$ is ethylene.

Group $R^2$ in Formulas (I), (I-A), (I-B), and (I-B-1) can be an alkylene, an alkylene substituted with an aryl, or a heteroalkylene. In some embodiments, $R^2$ is an alkylene having 1 to 10 carbon atoms, 2 to 10 carbon atoms, 3 to 10 carbon atoms, 1 to 6 carbon atoms, 2 to 6 carbon atoms, 3 to 6 carbon atoms, 1 to 4 carbon atoms, or 2 to 4 carbon atoms. The alkylene can be optionally substituted with an aryl. The aryl substituted on an alkylene $R^2$ group is often phenyl but can be other aryl groups having 6 to 12 carbon atoms or 6 to 10 carbon atoms. In other embodiments, $R^2$ is a heteroalkylene having 2 to 10 carbon atoms, 3 to 10 carbon atoms, 2 to 6 carbon atoms, 3 to 6 carbon atoms, or 2 to 4 carbon atoms and up to 5 heteroatoms, up to 4 heteroatoms, up to 3 heteroatoms, up to 2 heteroatoms, or with one heteroatom. If $R^2$ is a heteroalkylene, the heteroatoms are often oxygen. If Y is —NH—(CO)—, then $R^2$ has greater than 2 carbon atoms such as 3 to 10 carbon atoms.

Group Z in Formulas (I), (I-A), (I-B), and (I-B-1) is often oxy (—O—).

The biotin-containing monomer of Formula (I) can be prepared in any suitable manner. In some embodiments, a biotin alkyl ester of Formula (3)

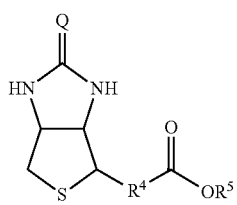

(3)

is synthesized by reacting biotin of Formula (1) and an alcohol of Formula (4)

$$R^5—OH \quad (4)$$

in the presence of an acid catalyst. The group $R^5$ in Formula (4) is an alkyl. The alkyl often has 1 to 10 carbon atoms, 1 to 6 carbon atoms, 1 to 4 carbon atoms, or 1 to 3 carbon atoms. In many embodiments, the alcohol of Formula (4) is methanol, the biotin compound of Formula (1) is of Formula (1-1), and the biotin alkyl ester of Formula (3) is of Formula (3-1).

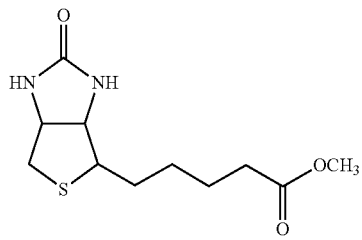

(3-1)

Preparation of the biotin alkyl ester is described in Sundberg et al., *J. Am. Chem. Soc.,* 117, 12050-12057 (1995). The biotin alkyl ester of Formula (3) can be reacted with an alkylene diamine such as a diamine of Formula (5)

$$H_2N—R^3—NH_2 \quad (5)$$

to form an amine compound of Formula (6).

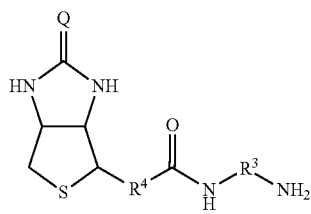

(6)

Group $R^3$ in Formulas (5) and (6) is the same as described above in Formula (I). In many embodiments, the compound of Formula (6) is of Formula (6-1).

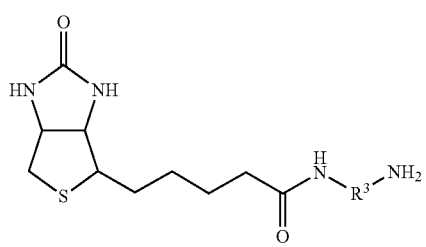

(6-1)

The amine compound of Formula (6) or (6-1) then can be reacted with various compounds to introduce a (meth)acryloyl group of formula $CH_2=CHR^1—(CO)—$ to form the compound of Formula (I).

In some embodiments of preparing the compound of Formula (I), the amine compound of Formula (6) or (6-1) is reacted with an alkenyl azlactone of Formula (7) to introduce a (meth)acryloyl group.

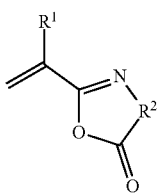

(7)

Groups $R^1$ and $R^2$ are the same as described above for Formula (I). Suitable examples of compounds of Formula (7) include 4,4-dimethyl-2-vinyl-4H-oxazol-5-one (vinyldimethylazlactone, VDM), 4,4-dimethyl-2-isopropenyl-4H-oxazol-5-one, 4,4-dimethyl-2-vinyl-4,5-dihydro-[1,3] oxazin-6-one, 4,5-dimethyl-2-vinyl-4,5-dihydro-[1,3] oxazin-6-one, 4-methyl-4-phenyl-2-vinyl-4H-oxazol-5-one, and the like, and combinations thereof. The reaction product is the monomer of Formula (I-C).

(I-C)

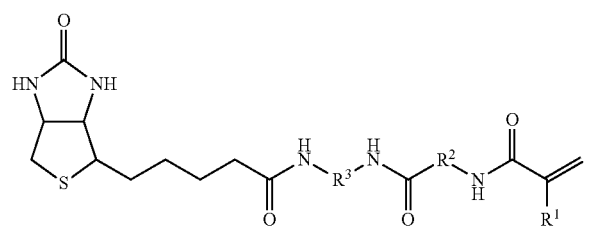

In many embodiments, the monomer of Formula (I-C) is of Formula (I-C-1) based on the initial biotin compound used in the synthesis process.

(I-C-1)

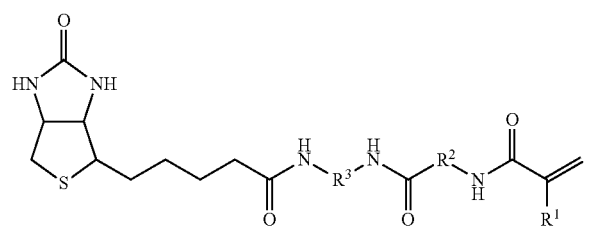

In many embodiments of forming the monomeric units of Formula (I-C), the alkenyl azlactone of Formula (7) that is reacted with the compound of Formula (6) is 4,4-dimethyl-2-vinyl-4H-oxazol-5-one (VDM) and the resulting compound of Formula (I-C) is of Formula (I-C-2) where $R^2$ is —C(CH$_3$)$_2$—.

(I-C-2)

The monomer of Formula (I-C-2) is often of Formula (I-C-3) based on the initial biotin compound used in the synthesis process.

(I-C-3)

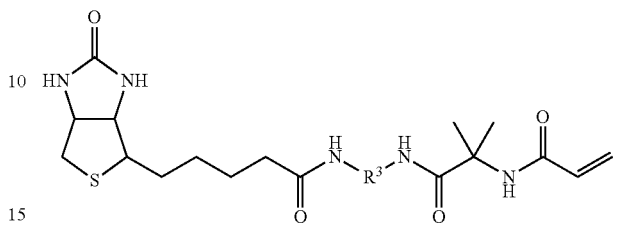

In some more specific embodiments of Formula (I-C-3), group $R^3$ is ethylene as shown in the compounds of Formula (I-C-4).

(I-C-4)

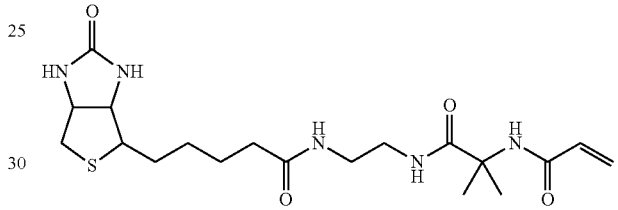

Other biotin-containing monomers can be prepared by reaction of the amine compound of Formula (6) with an isocyanato-containing monomer. The isocyanate-containing monomer can be of Formula (8).

$$OCN-R^2-Z-(CO)-CR^1=CH_2 \qquad (8)$$

Groups $R^1$, $R^2$, and Z are the same as defined above for Formula (I). Examples of isocyanato-containing monomers of Formula (8) include 2-isocyanatoethyl (meth)acrylate, 3-isocyanatopropyl (meth)acrylate, 4-isocyanatocyclohexyl (meth)acrylate, and 2-(2-isocyanatoethoxy)ethyl (meth) acrylate. The reaction product is of Formula (I-D).

(I-D)

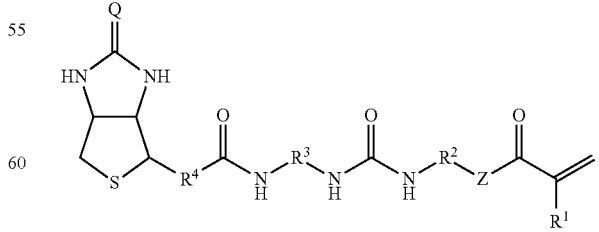

In many embodiments, the monomer of Formula (I-D) is of Formula (I-D-1) or (I-D-2) based on the initial biotin compound used in the synthesis process.

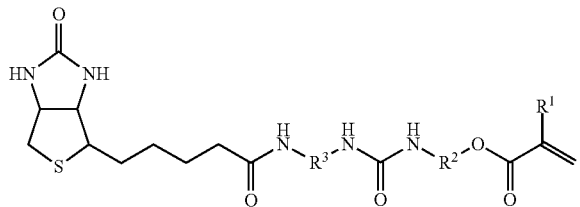
(I-D-1)

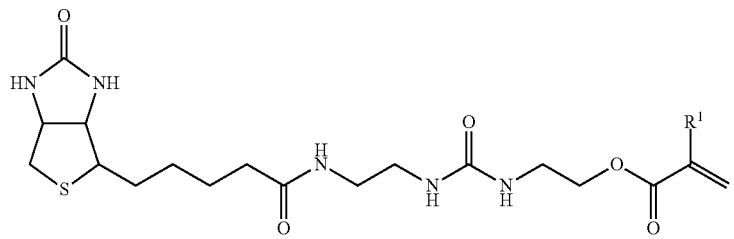
(I-D-3)

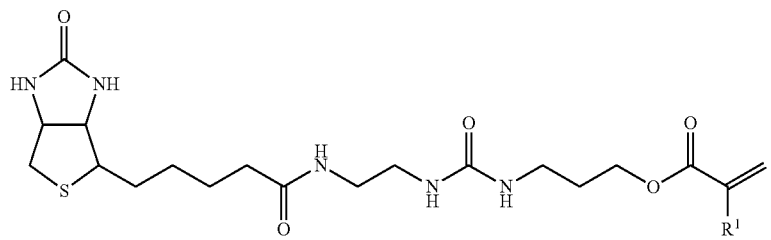
(I-D-4)

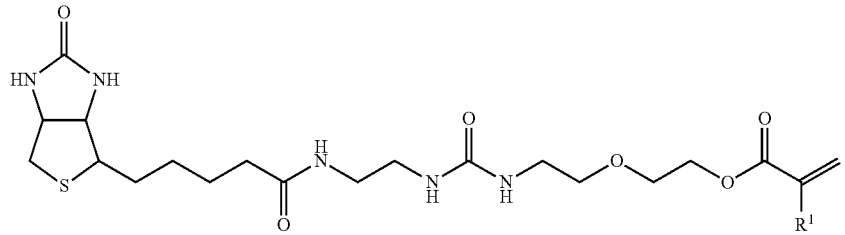
(I-D-5)

-continued

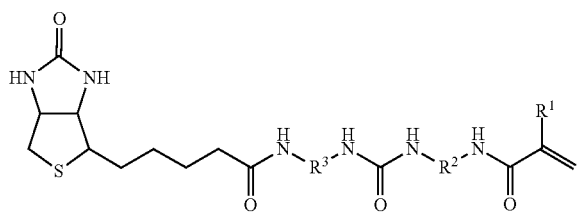
(I-D-2)

In some specific embodiments of Formula (I-D), (I-D-1), and (I-D-2), the group $R^3$ is an alkylene having 1 to 10 carbon atoms, 2 to 10 carbon atoms, 2 to 6 carbon atoms, or 2 to 4 carbon atoms. Group $R^2$ is an alkylene group with 2 to 10 carbon atoms (e.g., 2 to 6 carbon atoms or 2 to 4 carbon atoms) or a heteroalkylene of formula $—[(CH_2)_n—O—(CH_2)_n]_x—$ where the variable n is 2 or 3 and the variable x is an integer in a range of 1 to 10 or larger, 1 to 8, 1 to 6, 1 to 4, or 1 to 3.

In many embodiments of Formula (I-D), group Z is —O— and the monomer is of Formula (I-D-1). Some more particular compounds of Formula (I-D-1) are monomers of Formula (I-D-3), (I-D-4), or (I-D-5) where $R^1$ is hydrogen or methyl, where $R^2$ is respectively $—CH_2CH_2—$, $—CH_2CH_2CH_2—$, or $—CH_2CH_2—O—CH_2CH_2—$, and where $R^3$ is ethylene.

Polymeric Material

Polymeric materials prepared by polymerizing a biotin-containing monomer of Formula (I) are provided. The polymeric material can contain 1 to 100 mole percent monomeric units derived from the monomer of Formula (I) based on the total moles of monomeric units in the polymeric material. This is equivalent to saying that the polymerizable composition used to form the polymeric material contains 1 to 100 mole percent monomer of Formula (I) based on the total moles of monomers in the polymerizable composition. The amount of monomer of Formula (I) in the polymerizable composition can be at least 1 mole percent, at least 2 mole percent, at least 3 mole percent, at least 4 mole percent, at least 5 mole percent, at least 10 mole percent, at least 15 mole percent, at least 20 mole percent, at least 25 mole percent, at least 30 mole percent, at least 35 mole percent, at least 40 mole percent, at least 45 mole percent, or at least 50 mole percent and up to 100 mole percent, up to 99 mole percent, up to 98 mole percent, up to 95 mole percent, up to 90 mole percent, up to 80 mole percent, up to 75 mole percent, up to 70 mole percent, up to 60 mole percent, up to 50 mole percent, up to 40 mole percent, up to 30 mole percent, up to 25 mole percent, up to 20 mole percent, or up to 10 mole percent based on the total moles of monomers in the polymerizable composition.

Stated differently on a weight basis, the polymeric material can contain 4 to 100 weight percent monomeric units derived from the monomer of Formula (I) based on the total weight of monomeric units in the polymeric material. This is equivalent to saying that the polymerizable composition used to form the polymeric material contains 4 to 100 weight percent monomer of Formula (I) based on the total weight of monomers in the polymerizable composition. If the amount of the biotin-containing monomer is too low, there may not be adequate binding to the biotin-binding protein. The amount of monomer of Formula (I) in the polymerizable composition can be at least 4 weight percent, at least 5 weight percent, at least 6 weight percent, at least 8 weight percent, at least 10 weight percent, at least 15 weight percent, at least 20 weight percent, at least 25 weight percent, at least 30 weight percent, at least 35 weight percent, at least 40 weight percent, at least 45 weight percent, or at least 50 weight percent and up to 100 weight percent, up to 99 weight percent, up to 95 weight percent, up to 90 weight percent, up to 80 weight percent, up to 75 weight percent, up to 70 weight percent, up to 60 weight percent, up to 50 weight percent, up to 40 weight percent, up to 30 weight percent, up to 20 weight percent, or up to 10 weight percent based on the total weight of monomers in the polymerizable composition.

If the polymeric material is a homopolymer and if Y is equal to —NH—(CO)—, then $R^2$ has greater than 2 carbon atoms. If the polymeric material is a copolymer and if Y is equal to —NH—(CO), then $R^2$ can have at least one, at least 2, or at least 3 carbon atoms.

While the polymeric material can be a homopolymer, the polymeric material is typically formed from a polymerizable composition that includes a monomer mixture that contains the biotin-containing monomer of Formula (I) plus a hydrophilic second monomer with a single ethylenically unsaturated group and/or a hydrophilic crosslinking monomer having a plurality of ethylenically unsaturated groups. The ethylenically unsaturated group can be a vinyl group or a (meth)acryloyl-containing group of formula $CH_2=CR^1$—(CO)—$Z^1$— where Z is —O— or —$NR^6$—. Group $R^6$ is hydrogen, alkyl, or aryl. In most embodiment where $Z^1$ is equal to —$NR^6$, group $R^6$ is equal to hydrogen.

When the polymeric material is used for affinity capture purposes, the hydrophilic second monomer having a single ethylenically unsaturated group is often selected to increase the amount of the biotin-binding protein that can be captured. That is, the hydrophilic second monomeric units in the polymeric material can separate the biotin-containing functional groups from each other allowing increased interactions with the biotin-binding protein being captured. In addition to having a single ethylenically unsaturated group, the hydrophilic second monomer typically contains a non-ionic hydrophilic group such as an hydroxy group, primary amido group, secondary amido group, tertiary amido group, or ether group (i.e., a group containing at least one alkylene-oxy-alkylene group of formula —R—O—R— where each R is an alkylene having 1 to 4 carbon atoms). The number of alkylene-oxy-alkylene groups can be from 1 to 10 or greater, 1 to 8, 1 to 6, 1 to 4, or 1 to 3.

Exemplary hydroxy-containing second monomers include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), hydroxyalkyl (meth)acrylamides (e.g., 2-hydroxyethyl (meth)acrylamide or 3-hydroxypropyl (meth)acrylamide), ethoxylated hydroxyethyl (meth)acrylate (e.g., monomers commercially available from Sartomer (Exton, PA, USA) under the trade designation CD570, CD571, and CD572), and aryloxy substituted hydroxyalkyl (meth)acrylates (e.g., 2-hydroxy-2-phenoxypropyl (meth)acrylate).

Exemplary second monomers with a primary amido group include (meth)acrylamide. Exemplary second monomers with secondary amido groups include, but are not limited to, N-alkyl (meth)acrylamides such as N-methyl (meth)acrylamide, N-ethyl (meth)acrylamide, N-isopropyl (meth)acrylamide, N-tert-octyl (meth)acrylamide, or N-octyl (meth)acrylamide. Exemplary second monomers with a tertiary amido group include, but are not limited to, N-vinyl caprolactam, N-vinyl-2-pyrrolidone, (meth)acryloyl morpholine, and N,N-dialkyl (meth)acrylamides such as N,N-dimethyl (meth)acrylamide, N,N-diethyl (meth)acrylamide, N,N-dipropyl (meth)acrylamide, and N,N-dibutyl (meth)acrylamide.

Exemplary second monomers with an ether group include, but are not limited to, alkoxylated alkyl (meth)acrylates such as ethoxyethoxyethyl (meth)acrylate, 2-methoxyethyl (meth)acrylate, and 2-ethoxyethyl (meth)acrylate; and poly(alkylene oxide) (meth)acrylates such as poly(ethylene oxide) (meth)acrylates and poly(propylene oxide) (meth)acrylates. The poly(alkylene oxide) acrylates are often referred to as poly(alkylene glycol) (meth)acrylates. These second monomers can have any suitable end group such as a hydroxyl group or an alkoxy group. For example, when the end group is a methoxy group, the monomer can be referred to as methoxy poly(ethylene glycol) (meth)acrylate.

Stated in terms of moles, the amount of hydrophilic second monomer can be in a range of 0 to 99 mole percent based on total moles of monomeric material in the polymerizable composition. The amount can be at least 0.1 mole percent, at least 0.2 mole percent, at least 0.5 mole percent, at least 1 mole percent, at least 2 mole percent, at least 5 mole percent, at least 10 mole percent, at least 20 mole percent, at least 25 mole percent, at least 30 mole percent, at least 40 mole percent, at least 50 mole percent, at least 60 mole percent, at least 70 mole percent, or at least 75 mole percent and up to 99 mole percent, up to 98 mole percent, up to 97 mole percent, up to 96 mole percent, up to 95 mole percent, up to 90 mole percent, up to 85 mole percent, up to 80 mole percent, up to 75 mole percent, up to 70 mole percent, up to 65 mole percent, up to 60 mole percent, up to 55 mole percent, up to 50 mole percent, or up to 40 mole percent.

The polymerizable composition used to form the polymeric material can optionally include a hydrophilic crosslinking monomer having at least two ethylenically unsaturated groups. Exemplary hydrophilic crosslinking monomers include ethylene glycol di(meth)acrylate, diethylene glycol di(meth)acrylate, poly(ethylene glycol) di(meth)acrylates, polyurethane di(meth)acrylate, propoxylated glycerin tri(meth)acrylate, N,N'-methylenebis(meth)acrylamide, ethylenebisacrylamide, hexamethylenebisacrylamide, diacryloylpiperazine, 1,4-butanediol di(meth)acrylate, 1,6-hexanediol di(meth)acrylate, glycerol di(meth)acrylate, and the like.

The amount of crosslinking monomer used depends on the desired end use of the polymeric material. If the end use of the polymeric material is as affinity chromatographic particles (e.g., beads), the amount of crosslinking monomer can be up to 99 mole percent based on the total moles of monomers in the polymerizable composition. For example, the amount can be at least 0.01 mole percent, at least 0.05 mole percent, at least 0.1 mole percent, at least 0.2 mole percent, at least 0.5 mole percent, at least 1 mole percent, at least 2 mole percent, at least 5 mole percent, at least 10 mole percent, at least 20 mole percent, at least 25 mole percent, at least 30 mole percent, at least 40 mole percent, at least 50 mole percent, at least 60 mole percent, at least 70 mole percent, or at least 75 mole percent and up to 99 mole percent, up to 98 mole percent, up to 97 mole percent, up to 96 mole percent, up to 95 mole percent, up to 90 mole percent, up to 85 mole percent, up to 80 mole percent, up to 75 mole percent, up to 70 mole percent, up to 65 mole percent, up to 60 mole percent, up to 55 mole percent, up to 50 mole percent, or up to 40 mole percent.

If the polymeric material is to be used as a coating on a substrate, the amount of crosslinking monomer may be less and can range, for example, up to 20 mole percent, up to 15 mole percent, up to 10 mole percent, or up to 5 mole percent based on the total moles of monomers in the polymerizable composition. When the polymeric material is grafted to a substrate, the amount of crosslinker can be even lower such as up to 5 mole percent, up to 4 mole percent, up to 2 mole percent, up to 1 mole percent, up to 0.5 mole percent, or up to 0.1 mole percent. In some embodiments, such as when the polymeric material is grafted to a substrate, there is no crosslinking monomer in the polymerizable composition. The amounts are based on the total moles of monomers in the polymerizable composition.

Overall, the polymerizable composition often contains 1 to 100 mole percent monomer of Formula (I) and 0 to 99 mole percent hydrophilic second monomer and/or hydrophilic crosslinking monomer. This is equivalent to stating that the polymerizable composition used to form the polymeric material contains 1 to 100 mole percent monomer of Formula (I) and 0 to 99 mole percent hydrophilic second monomer and/or hydrophilic crosslinking monomer based on the total moles of monomers in the polymerizable composition. In some embodiments, the polymerizable composition contains 1 to 90 mole percent monomer of Formula (I) and 10 to 99 mole percent hydrophilic second monomer and/or hydrophilic crosslinking monomer, 1 to 80 mole percent monomer of Formula (I) and 20 to 99 mole percent hydrophilic second monomer and/or hydrophilic crosslinking monomer, 1 to 70 mole percent monomer of Formula (I) and 30 to 99 mole percent hydrophilic second monomer and/or hydrophilic crosslinking monomer, 1 to 60 mole percent monomer of Formula (I) and 40 to 99 mole percent hydrophilic second monomer and/or hydrophilic crosslinking monomer, or 1 to 50 mole percent monomer of Formula (I) and 50 to 99 mole percent hydrophilic second monomer and/or hydrophilic crosslinking monomer.

In some examples, the polymerizable composition contains 2 to 50 mole percent monomer of Formula (I) and 50 to 98 mole percent hydrophilic second monomer and/or hydrophilic crosslinking monomer, 3 to 50 mole percent monomer of Formula (I) and 50 to 97 mole percent hydrophilic second monomer and/or hydrophilic crosslinking monomer, 5 to 50 mole percent monomer of Formula (I) and 50 to 95 mole percent hydrophilic second monomer and/or hydrophilic crosslinking monomer, 10 to 50 mole percent monomer of Formula (I) and 50 to 90 mole percent hydrophilic second monomer and/or hydrophilic crosslinking monomer, 15 to 50 mole percent monomer of Formula (I) and 50 to 85 mole percent hydrophilic second monomer and/or hydrophilic crosslinking monomer, 20 to 50 mole percent monomer of Formula (I) and 50 to 80 mole percent hydrophilic second monomer and/or hydrophilic crosslinking monomer, or 25 to 50 mole percent monomer of Formula (I) and 50 to 75 mole percent hydrophilic second monomer and/or hydrophilic crosslinking monomer. In other examples, the polymerizable composition contains 1 to 40 mole percent monomer of Formula (I) and 60 to 99 mole percent hydrophilic second monomer and/or hydrophilic crosslinking monomer, 5 to 40 mole percent monomer of Formula (I) and 60 to 95 mole percent hydrophilic second monomer and/or hydrophilic crosslinking monomer, 1 to 30 mole percent monomer of Formula (I) and 70 to 99 mole percent hydrophilic second monomer and/or hydrophilic crosslinking monomer, 5 to 30 mole percent monomer of Formula (I) and 70 to 95 mole percent hydrophilic second monomer and/or hydrophilic crosslinking monomer, 1 to 20 mole percent monomer of Formula (I) and 80 to 99 mole percent hydrophilic second monomer and/or hydrophilic crosslinking monomer, or 1 to 10 mole percent monomer of Formula (I) and 90 to 99 mole percent hydrophilic second monomer and/or hydrophilic crosslinking monomer. In some embodiments, there is no crosslinking monomer included in the polymerizable composition.

In addition to the monomers, the polymerizable composition typically includes either a photoinitator (Type I or Type II) or thermal initiator. Examples of suitable thermal initiators include peroxides such as benzoyl peroxide, dibenzoyl peroxide, dilauryl peroxide, cyclohexane peroxide, methyl ethyl ketone peroxide, hydroperoxides (for example, tert-butyl hydroperoxide and cumene hydroperoxide), dicyclohexyl peroxydicarbonate, t-butyl perbenzoate; and the like; and combinations thereof. Examples of commercially available thermal initiators include initiators available from DuPont Specialty Chemical (Wilmington, DE) under the VAZO trade designation including VAZO 67 (2,2'-azo-bis(2-methylbutyronitrile)), VAZO 64 (2,2'-azo-bis(isobutyronitrile)), and VAZO 52 (2,2'-azo-bis(2,2-dimethylvaleronitrile)), as well as that available under the trade designation LUCIDOL 70 (benzoylperoxide) from Elf Atochem North America (Philadelphia, PA).

Type I photoinitiators function by an alpha-cleavage that forms two radical species. At least one of the radical species initiates polymerization of the monomers. Example Type I photoinitiators include benzoin ethers such as benzoin methyl ether and benzoin isopropyl ether; substituted acetophenones such as 2,2-dimethoxyacetophenone available as IRGACURE 651 photoinitiator (Ciba Specialty Chemicals), 2,2 dimethoxy-2-phenyl-1-phenylethanone available as ESACURE KB-1 photoinitiator (Sartomer Co., West Chester, PA), 1-[4-(2-hydroxyethoxy)phenyl]-2-hydroxy-2-methyl-1-propan-1-one available as IRGACURE 2959 (Ciba Specialty Chemicals), and dimethoxyhydroxyacetophenone; substituted α-ketols such as 2-methyl-2-hydroxy propiophenone; aromatic sulfonyl chlorides such as 2-naphthalene-sulfonyl chloride; photoactive oximes such as 1-phenyl-1,2-propanedione-2-(O-ethoxy-carbonyl)oxime; and the like; and combinations thereof. Particularly preferred among these are the substituted acetophenones (especially 1-[4-(2-hydroxyethoxy)phenyl]-2-hydroxy-2-methyl-1-propan-1-one, IRGACURE 2959, due to its water solubility). Another useful polymerizable photoinitiator is a 1:1 adduct of 2-vinyl-4,4-dimethylazlactone and IRGACURE 2959, which can be prepared essentially as described in Example 1 of U.S. Pat. No. 5,506,279 (Babu et al.).

Other useful photoinitiators include hydrogen-abstracting (Type II) photoinitiators such as benzophenone, 4-(3-sulfopropyloxy)benzophenone sodium salt, Michler's ketone, benzil, anthraquinone, 5,12-naphthacenequinone, aceanthracenequinone, benz(A)anthracene-7,12-dione, 1,4-chrysenequinone, 6,13-pentacenequinone, 5,7,12,14-pentacenetetrone, 9-fluorenone, anthrone, xanthone, thioxanthone, 2-(3-sulfopropyloxy)thioxanthen-9-one, acridone, dibenzosuberone, acetophenone, chromone, and the like, and combinations thereof.

The initiator can be used in an amount effective to initiate free radical polymerization of the monomers. Such amount will vary depending upon, for example, the type of initiator and polymerization conditions utilized. The initiator generally can be used in amounts ranging from 0.01 to 5 weight percent based on the total weight of monomers in the polymerizable composition. The amount can be at least 0.01 weight percent, at least 0.05 weight percent, at least 0.1 weight percent, at least 0.2 weigh percent, at least 0.5 weight percent, at least 1 weight percent and up to 5 weight percent, up to 3 weight percent, or up to 2 weight percent.

A solvent is often included in the polymerizable composition. The solvent, which can be water, an organic solvent, or a water/organic solvent mixture, is selected so that it can substantially dissolve (or, in the case of emulsion or suspension polymerizations, disperse or suspend) the monomers and initiator in the polymerizable composition. The solvent, however, should not negatively impact any substrate (e.g., decrease the flexibility or porosity of the substrate) that the polymerizable composition is positioned next to in the process of preparing an article.

In many embodiments, the solvent can be water or a water/water-miscible organic solvent mixture. The ratio of water to organic solvent can vary widely, depending upon monomer solubility and any substrate selected to prepare an article. With some monomers and/or with some substrates, the ratio is often greater than 1:1 (volume/volume) water to organic solvent. In some polymerizable compositions, the ratio is greater than 3:1, greater than 5:1, greater than 6:1, or greater than 7:1. With other monomers, a greater proportion of organic solvent (even up to 100 percent) can be used such as when the organic solvent is an alcohol. Any such water-miscible organic solvent preferably has no groups that would retard polymerization. In some embodiments, the water-miscible organic solvents can be protic group-containing organic liquids such as the lower alcohols having 1 to 4 carbon atoms, lower glycols having 2 to 6 carbon atoms, and lower glycol ethers having 3 to 6 carbon atoms and 1 to 2 ether linkages. In some embodiments, higher glycols such as poly(ethylene glycol) can be used. Specific examples of water-miscible organic solvents that can be used that contain a protic group include methanol, ethanol, isopropanol, n-butanol, t-butyl alcohol, ethylene glycol, methoxyethanol, ethoxyethanol, propoxyethanol, butoxyethanol, methyl carbitol, ethyl carbitol, and the like, and combinations thereof.

In other embodiments, non-protic water-miscible organic solvents can be used. Such solvents include aliphatic esters (for example, methoxyethyl acetate, ethoxyethyl acetate, propoxyethyl acetate, butoxyethyl acetate, and triethyl phosphate), ketones (for example, acetone, methyl ethyl ketone, and methyl propyl ketone), and sulfoxides (for example, dimethyl sulfoxide). However, care must be taken as these solvents may dissolve or damage certain substrates. With some substrates, the ratio of water to non-protic organic solvent is often greater than 3:1 (volume/volume) water to organic solvent.

The monomer concentration in the solvent can vary, depending upon numerous factors including, but not limited to, the structure of the monomers used, the extent of polymerization desired, the reactivity of the monomers, the composition of the substrate, and the solvent selected. Typically, the monomer concentration can range from 0.1 weight percent to 60 weight percent in the solvent. For example, the monomer concentration in the solvent can be at least 0.1 weight percent, at least 0.5 weight percent, at least 1 weight percent, at least 2 weight percent, at least 5 weight percent, at least 10 weight percent, or at least 20 weight percent and up to 60 weight percent, up to 50 weight percent, up to 40 weight percent, up to 30 weight percent, or up to 20 weight percent based on the total weight of monomers in the total weight of solvent.

An aqueous monomer mixture can be polymerized as a suspension or dispersion in a nonpolar, immiscible organic solvent, optionally in the presence of added porogen(s), to produce crosslinked, porous particles containing monomeric units derived from the monomer of Formula (I). Such methods are well known and are described, for example, in U.S. Pat. No. 7,098,253 (Rasmussen et al.), U.S. Pat. No. 7,674,835 (Rasmussen et al.), U.S. Pat. No. 7,647,836 (Rasmussen et al.), and U.S. Pat. No. 7,683,100 (Rasmussen et al.).

Articles

If desired, the polymerization reaction can be carried out in the presence of a substrate to form an article containing the substrate bearing the resulting polymeric material. For example, the polymerizable composition can be imbibed or coated (or otherwise deposited) on a substrate to form a treated substrate. The term "treated substrate" refers to the substrate after being imbibed or coated with the polymerizable composition. The treated substrate is then subjected to conditions that will result in polymerization of the polymerizable composition.

That is, an article is provided that includes a substrate and a polymeric material disposed on the substrate, wherein the polymeric material is the same as described above. In many embodiments, the polymeric material is irreversibly bonded to the substrate.

The substrate can be in any desired form such as particles (e.g., beads), fibers, films, webs, membranes, sponges, or sheets. Suitable substrates can be organic, inorganic, or a combination thereof. In many embodiments, the substrate is a polymeric material. The substrate is often selected to be porous. Example substrates can be in the form of porous particles, porous membranes, porous nonwoven webs, porous woven webs, porous sponges, porous fibers, and the like, and combinations thereof. In many embodiments, the preferred substrates include porous membranes (more preferably, porous polymeric membranes) and combinations thereof.

In many embodiments such as when the substrate is a porous membrane, the substrate is flexible before being exposed to the polymerizable composition, after being imbibed or coated with the polymerizable composition, and after reacting the polymerizable composition to form a polymeric material. As used herein, the term "flexible" means that a substrate and/or an article can undergo a roll up action with a bend radius of 5 millimeters or less, 2 millimeters or less, or 1 millimeter or less without failure or visible defects, such as delamination, cracking, crazing, or breaking.

Polymeric substrates can be formed from any suitable thermoplastic polymeric material. Suitable thermoplastic polymeric materials include, for example, polyolefins, poly(isoprenes), poly(butadienes), fluorinated polymers, chlorinated polymers, polyamides, polyimides, polyethers, poly(ether sulfones), poly(sulfones), poly(vinyl acetates), polyesters such as poly(lactic acid), copolymers of vinyl acetate such as poly(ethylene)-co-poly(vinyl alcohol), poly (phosphazenes), poly(vinyl esters), poly(vinyl ethers), poly (vinyl alcohols), poly(carbonates), and the like, and combinations thereof.

In some embodiments, the thermoplastic polymer can be surface treated, such as by plasma discharge or by use of a primer, to provide suitable functionality to the surface of the substrate. Surface treatment can provide functional groups such as hydroxy groups that can improve wetting by the polymerizable composition. One such useful plasma treatment is described in U.S. Pat. No. 7,125,603 (David et al.).

Suitable polyolefins include poly(ethylene), poly(propylene), poly(1-butene), copolymers of ethylene and propylene, alpha olefin copolymers (such as copolymers of ethylene or propylene with 1-butene, 1-hexene, 1-octene, and 1-decene), poly(ethylene-co-1-butene), poly(ethylene-co-1-butene-co-1-hexene), and the like, and combinations thereof.

Suitable fluorinated polymers include poly(vinyl fluoride), poly(vinylidene fluoride), copolymers of vinylidene fluoride (such as poly(vinylidene fluoride-co-hexafluoropropylene)), copolymers of chlorotrifluoroethylene (such as poly(ethylene-co-chlorotrifluoroethylene)), and the like, and combinations thereof.

Suitable polyamides include poly(iminoadipolyliminohexamethylene), poly(iminoadipolyliminodecamethylene), polycaprolactam, and the like, and combinations thereof. Suitable polyimides include poly(pyromellitimide), and the like, and combinations thereof.

Suitable poly(ether sulfones) include poly(diphenylether sulfone), poly(diphenylsulfone-co-diphenylene oxide sulfone), and the like, and combinations thereof. In some embodiments, substrates comprising poly(ether sulfones) are preferred because articles having a large capacity for affinity capture of biotin-binding proteins or other types of biotin-binding biomaterials can be prepared.

Suitable copolymers of vinyl acetate include poly(ethylene-co-vinyl acetate), such copolymers in which at least some of the acetate groups have been hydrolyzed to afford various poly(vinyl alcohols), and the like, and combinations thereof.

The substrate can be, for example, a microporous membrane such as a thermally induced phase separation (TIPS) membrane. TIPS membranes are often prepared by forming a solution of a thermoplastic material and a second material above the melting point of the thermoplastic material. Upon cooling, the thermoplastic material crystallizes and phase separates from the second material. The crystallized material is often stretched. The second material is optionally removed either before or after stretching. Microporous membranes are further described in U.S. Pat. No. 4,539,256 (Shipman), U.S. Pat. No. 4,726,989 (Mrozinski), U.S. Pat. No. 4,867,881 (Kinzer), U.S. Pat. No. 5,120,594 (Mrozinski), U.S. Pat. No. 5,260,360 (Mrozinski), and U.S. Pat. No. 5,962,544 (Waller, Jr.). Some exemplary TIPS membranes include poly(vinylidene fluoride) (PVDF), polyolefins such as poly (ethylene) or poly(propylene), vinyl-containing polymers or copolymers such as ethylene-vinyl alcohol copolymers and butadiene-containing polymers or copolymers, and acrylate-containing polymers or copolymers. For some applications, a TIPS membrane including PVDF can be particularly desirable. TIPS membranes including PVDF are further described in U.S. Pat. No. 7,338,692 (Smith et al.).

In many embodiments, the substrate is porous and has an average pore size that is usually greater than 0.1 micrometers or 0.2 micrometers in order to minimize size exclusion separations, minimize diffusion constraints, and maximize surface area. The pore size can be in the range of 0.1 to 10 micrometers, in a range of 0.2 to 10 micrometers, in a range of 0.5 to 10 micrometers, in a range of 1 to 10 micrometers, in a range of 0.1 to 5 micrometers, in in a range of 0.5 to 5 micrometers, or in a range of 1 to 5 micrometers. Preferably, the substrate remains porous after treating with the polymerizable composition and polymerizing the polymerizable composition to form a polymeric material.

In an exemplary embodiment, the substrate can include a nylon microporous film or sheet (for example, a microporous membrane), such as those described in U.S. Pat. No. 6,056,529 (Meyering et al.), U.S. Pat. No. 6,267,916 (Meyering et al.), U.S. Pat. No. 6,413,070 (Meyering et al.), U.S. Pat. No. 6,776,940 (Meyering et al.), U.S. Pat. No. 3,876,738 (Marinaccio et al.), U.S. Pat. No. 3,928,517 (Knight et al.), U.S. Pat. No. 4,707,265 (Barnes, Jr. et al.), and U.S. Pat. No. 5,458,782 (Hou et al.).

In other embodiments, the substrate can be a nonwoven web, which can include nonwoven webs manufactured by any of the commonly known processes for producing nonwoven webs. As used herein, the term "nonwoven web" refers to a fabric that has a structure of individual fibers or filaments that are randomly and/or unidirectionally interlaid in a mat-like fashion.

For example, the fibrous nonwoven web can be made by wet laid, carded, air laid, spunlaced, spunbonding, or meltblowing techniques, or combinations thereof. Spunbonded fibers are typically small diameter fibers that are formed by extruding molten thermoplastic polymer as filaments from a plurality of fine, usually circular capillaries of a spinneret, with the diameter of the extruded fibers being rapidly reduced. Meltblown fibers are typically formed by extruding molten thermoplastic material through a plurality of fine, usually circular, die capillaries as molten threads or filaments into a high velocity, usually heated gas (for example, air) stream, which attenuates the filaments of molten thermoplastic material to reduce their diameter. Thereafter, the meltblown fibers are carried by the high velocity gas stream and are deposited on a collecting surface to form a web of randomly dispersed, meltblown fibers. Any of the nonwoven webs can be made from a single type of fiber or from two or more fibers that differ in the type of thermoplastic polymer and/or thickness. Further details of manufacturing methods of useful nonwoven webs have been described by Wente in "Superfine Thermoplastic Fibers," 48 Indus. Eng. Chem. 1342 (1956) and by Wente et al. in "Manufacture of Superfine Organic Fibers," Naval Research Laboratories Report No. 4364 (1954).

In another aspect, a method of forming the article is provided. The method includes providing a substrate, forming a polymerizable composition comprising a monomer of Formula (I) as described above in the first aspect, contacting the substrate with the polymerizable composition, and polymerizing the polymerizable composition in the presence of the substrate. In many embodiments, the resulting polymeric material is irreversibly bonded to the substrate (e.g., covalently bonded to the substrate or intertwined with the substrate such that it cannot be separated). In some embodiments, the polymeric material is grafted to the substrate.

The polymerization composition is typically free of organic solvents that will dissolve the substrate, that will negatively impact the flexibility of the substrate, or that will negatively impact the porosity of the substrate. In many embodiments, the solvent is water or the water/water-miscible organic solvent mixtures described above that are suitable for reaction of the polymerizable composition.

To form the article, the substrate is contacted with the polymerizable composition. The substrate can be imbibed or coated with the polymerizable composition using conventional techniques such as, for example, dip coating, roll coating, spray coating, knife-coating, gravure coating, extrusion, die-coating, and the like. After treating the substrate with the polymerizable composition it may be desirable to remove any excess fluid from the polymerizable composition. This removal process may be particularly desirable when a thin coating of the polymeric material is to be formed on the surface of a nonwoven web (e.g., nonwoven film) or foam material. The excess fluid can be removed, for example, by passing the treated substrate though a nip formed between two rollers (e.g., rubber or rubber coated rollers) thereby squeezing the substrate, by application of a vacuum to remove volatile materials, or by blotting the treated substrate with absorbent media such as paper, cloth towel, or the like.

The treated substrate, coated or imbibed with the polymerizable composition, can then be subjected to an activation energy to polymerize the monomers and/or graft the monomers onto the substrate. The activation energy generates free radicals in solution (by cleaving at least some of the Type I photoinitiator molecules to form free radicals) or on the surface of the substrate (by exciting the Type II photoinitiator molecules which then abstract an atom from the substrate). A Type I photoinitiator is typically used when making a crosslinked coating on a substrate, while a Type II photoinitiator is typically used when grafting to a substrate. Electron beam or gamma irradiation can also be used to provide the activation energy necessary to generate free radicals in solution or on the surface of the substrate (the addition of a photoinitiator is not necessary in these cases). The free radicals then initiate polymerization of the monomer either in solution or starting at the surface radical sites of the substrate that were formed by exposure to the activation energy.

The activation energy may be provided by methods known in the art such as, for example, by exposure to ultraviolet radiation, electron beam radiation, or gamma radiation. The conditions under which the irradiation is conducted, such as radiation intensity and time may differ depending on the type of substrate used, the amount of monomer applied to the substrate, the type of irradiation, and the like.

Radiation may be applied using a conventional ultraviolet (UV) radiation such as may be provided by an excimer lamp or another type of UV emitting lamp or LED device. Irradiation is generally conducted using a UV lamp with an intensity in the range of from 100 to 700 watts per inch ("W/in"), preferably in the range of from 400 to 600 W/in for 0.1 seconds to 15 minutes or more, with the distance between the UV lamp and the substrate being 2 to 30 centimeters.

Electron beam polymerization and/or grafting can be accomplished using a commercially available electron beam accelerator, such as those available under the trade designation ELECTOCURTAIN CB 175 (Energy Sciences, Inc., Wilmington, Ma.). Accelerators operating in the 150 to 300 kilovolt range are acceptable. The beam current on such systems, typically 1 to 10 milliamperes, can be adjusted to obtain the desired dose of ionizing radiation. In general, it is desirable to irradiate the coated substrate with doses from about 1 to 16 megarads, more preferably 2 to 8 megarads. Particularly when using lower doses, it is desirable to purge oxygen from the polymerizable solution (as by bubbling nitrogen through the solution). The maximum dose would be that dose at which degradation of the substrate begins.

Desirably, the treated substrate is subjected to the activation energy in a reduced oxygen or non-oxidative environment, such as by placing the treated substrate in a reaction vessel or passing the treated substrate through a reaction chamber from which the air has been purged prior to energy activation of the monomer. The air may be purged from such a reaction vessel or chamber by purging with inert gas such as argon or nitrogen. This is desirable because atmospheric oxygen can act as a reaction terminator by combining with the surface radical sites formed from the radical forming groups on the surface of the substrate, and thereby reduce the number of initialization sites available to the monomer. In many instances, exposure to atmospheric oxygen can be minimized by positioning the treated substrate between two sheets of a thermoplastic polymeric film, such as polyester or polyolefin film. The temperature during irradiation is not critical and may be done at room temperature.

Although thermal processes are not preferred for reasons of solvent volatility, thermal polymerization or curing of the treated substrate is possible. For thermal curing, any suitable reaction vessel is used. For batch polymerizations, sprayed webs may be cured in an oven in an air or inert atmosphere, and optionally under vacuum. In the case of a continuous process, the web may be passed through a dryer, such as an infrared ("IR"), through air or the like. The polymerization temperature can vary depending on the thickness of the substrate, the concentration of monomer, the type of solvent used, and the type and amount of thermal initiator used in the blend. The polymerization is typically in the range of from 0° C. to 150° C. and preferably in the range of from 10° C. to 100° C., and more preferably in the range of 20° C. to 50° C. The polymerization time depends on the polymerization temperature and the identity of the initiator but is typically several seconds to 2 hours and preferably several seconds to 10 minutes.

Further details regarding the preparation of the articles are provided in the following references. For example, U.S. Pat. No. 9,616,394 (Bothof et al.) describes the free radical polymerization and grafting of monomers monomer(s) to the surface of a substrate in the presence of a Type II photoinitiator. International Patent Application Publication No. WO 2014/052215 (Rasmussen et al.) describes the formation of a crosslinked polymeric material that is free radically polymerized and grafted to a substrate including a crosslinked copolymer layer. The polymerizable composition contains photoinitiator-containing monomer units. In addition, U.S. Patent Application Publication No. 2012/0252091 A1 (Rasmussen et al.) describes free radical polymerization and grafting to a substrate having a crosslinked polymer primer layer. U.S. Patent Application Publication No. 2011/0100916 A1 (Shannon et al.) describes an exemplary method for free radical polymerization and grafting to a porous particle.

After irradiation, the resulting article may optionally be washed to remove unpolymerized monomer(s), non-crosslinked polymer, and/or non-grafted polymer, if desired. After irradiation and optional washing, the substrate with the irreversibly bonded copolymer thereon may be dried to remove any remaining solvent by such means as forced air ovens, infrared lamps and the like.

Following the polymerization, washing, and drying processes, typical total weight gains by the substrate generally can be in the range of 0.5 weight percent to 30 weight percent. The amount can be at least 0.5 weight percent, at least 1 weight percent, at least 2 weight percent, at least 5 weight percent, or at least 10 weight percent and up to 30 weight percent, up to 25 weight percent, up to 20 weight percent, up to 15 weight percent, or up to 10 weight percent. The polymeric material is usually irreversibly attached to the substrate. For affinity capture, the polymeric material is often grafted to the substrate. If desired, the polymerization can be carried out separately and the resulting polymer then coated (optionally in the presence of suitable crosslinker) or grafted or otherwise applied to the substrate, but this is generally less preferred.

The polymeric material with pendant biotin-containing groups can alter the original nature of the substrate. The article can retain many of the advantages of the original substrate (for example, mechanical and thermal stability, porosity, and so forth) but the pendant biotin groups can interact with and bind biotin-binding proteins or other biotin-binding biomaterials. The articles can further include conventional components such as housings, holders, adapters, and the like, and combinations thereof.

If desired, the efficiency of binding and affinity capture can be improved by using a plurality of stacked or layered, functionalized substrates (for example, functionalized porous membranes) as a filter element. Thus, a filter element can include one or more layers of functionalized substrate. The individual layers of the filter element can be the same or different. The layers can vary in porosity, degree of grafting, and so forth. The filter element can further include an upstream prefilter layer and/or a downstream support layer. The individual layers can be planar or pleated, as desired.

Examples of suitable prefilter and support layer materials include any suitable porous membranes of polypropylene, polyester, polyamide, resin-bonded or binder-free fibers (for example, glass fibers), and other synthetics (woven and nonwoven fleece structures); sintered materials such as polyolefins, metals, and ceramics; yarns; special filter papers (for example, mixtures of fibers, cellulose, polyolefins, and binders); polymer membranes; and the like; and combinations thereof.

Useful articles often include a filter cartridge including one or more of the above-described filter elements, a filter assembly including one or more of the above-described filter elements and a filter housing, and the like. Other useful articles can be in the form of an array of sample containers (e.g., a 96-well plate) with each container including a filter element having a contacting surface (e.g., an upstream or upper surface).

The article that includes a substrate with an irreversibly attached polymeric material having pendant biotin groups can be used for separating biotin-binding proteins from other proteins or biomaterials. That is, a separation method includes exposing the article to a mixture comprising biotin-binding proteins and non-biotin-binding biomaterials. The biotin-binding proteins are separated by binding to the pendant biotin groups of the polymeric material.

For example, the articles can be treated with an excess of a biotin-binding protein solution in order to immobilize the biotin-binding protein to the article by interacting with the pendant biotin groups. Since most biotin-binding proteins have multiple biotin-binding sites, the extra sites that are not bound to the biotin groups of the article can then be utilized to capture biotinylated biomacromolecules for assay, detection, removal, or other applications.

Recently, fusion proteins of biotin-binding proteins bonded to other biomaterials have been prepared. For example, the other biomaterial can be another protein (e.g., protein A), an enzyme, or an antibody. These fusion proteins have been suggested for use in labeling of proteins, as diagnostic markers, for affinity separations, for targeting specific cells such as cancer cells, or as an immobilization means for detection such as in ELISA assays.

Various embodiments are provided that include biotin-containing monomers, polymeric materials formed from the biotin-containing monomers, articles containing the polymeric material, methods of making the articles, and methods of using the articles are provided.

Embodiment 1A is a polymeric material that contains monomeric units derived from the biotin-containing monomer of Formula (I)

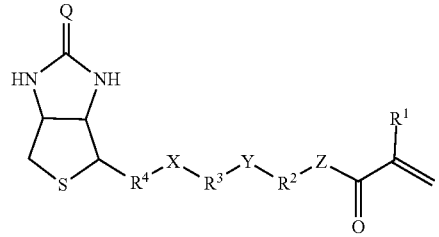

in an amount ranging from 1 to 100 mole percent based on total moles of monomeric units in the polymeric material. In Formula (I), group Q is oxygen or NH, group X is —(CO)—O— or —(CO)—NH—, group Y is —NH—(CO)—, —NH—(CO)—NH—, —O—(CO)—NH—, or —O—(CO)—, and group Z is —O— or —NH—. Group $R^1$ is hydrogen or methyl and group $R^2$ is an alkylene, an alkylene substituted with an aryl, or a heteroalkylene. Each group $R^3$ and $R^4$ is independently a (hetero)alkylene. If the polymeric material is a homopolymer and if Y is equal to —NH—(CO)—, then $R^2$ has greater than 2 carbon atoms.

Embodiment 2A is the polymeric material of embodiment 1A, wherein the polymeric material comprises 1 to 100 mole percent monomeric units derived from the monomer of Formula (I) and 0 to 99 mole percent monomeric units derived from a hydrophilic second monomer having a single ethylenically unsaturated group and/or derived from a hydrophilic crosslinking monomer having a plurality of ethylenically unsaturated groups. The mole percent amounts are based on total moles of monomeric units in the polymeric material.

Embodiment 3A is the polymeric material of 2A, wherein the polymeric material comprises 1 to 50 mole percent monomeric units derived from the monomer of Formula (I) and 50 to 99 mole percent monomeric units derived from the hydrophilic second monomer having a single ethylenically unsaturated group and/or derived from the hydrophilic crosslinking monomer having a plurality of ethylenically unsaturated groups. The mole percent amounts are based on total moles of monomeric units in the polymeric material.

Embodiment 4A is the polymeric material of 2A or 3A, wherein the polymeric material comprises 5 to 50 mole percent monomeric units derived from the monomer of Formula (I) and 50 to 95 mole percent monomeric units derived from the hydrophilic second monomer having a single ethylenically unsaturated group and/or derived from the hydrophilic crosslinking monomer having a plurality of ethylenically unsaturated groups. The mole percent amounts are based on total moles of monomeric units in the polymeric material.

Embodiment 5A is the polymeric material of embodiment 2A or 3A, wherein the hydrophilic second monomer has a hydrophilic group selected from a hydroxy group, primary amido group, secondary amido group, tertiary amido group, or ether group.

Embodiment 6A is the polymeric material of any one of embodiments 1A to 5A, wherein the monomer of Formula (I) is of Formula (I-B-1).

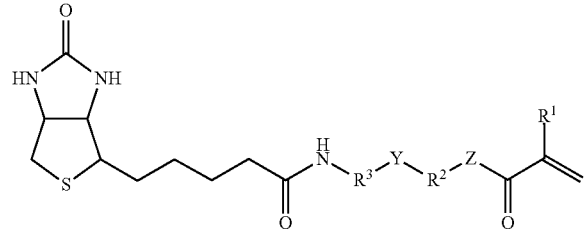

(I-B-1)

Embodiment 7A is the polymeric material of any one of embodiments 1A to 6A, wherein the monomer of Formula (I) is of Formula (I-C-3)

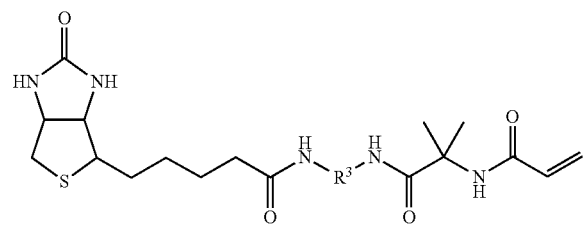

(I-C-3)

Embodiment 8A is the polymeric material of any one of embodiments 1A to 6A, wherein the monomer of Formula (I) is of Formula (I-D-1) or (I-D-2).

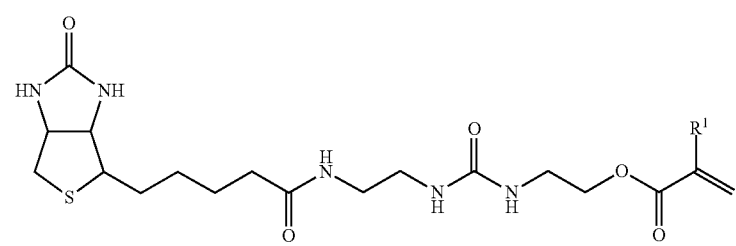

(I-D-1)

(I-D-2)

Embodiment 9A is the polymeric material of embodiment 8A, wherein the monomer of Formula (I) is of Formula (I-D-1).

Embodiment 10A is the polymeric material embodiment 9A, wherein the monomer of Formula (I-D-1) is of Formula (I-D-3), Formula (I-D-4), or Formula (I-D-5).

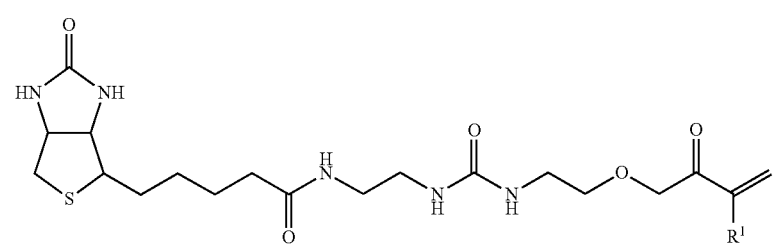

(I-D-3)

(I-D-4)

(I-D-5)

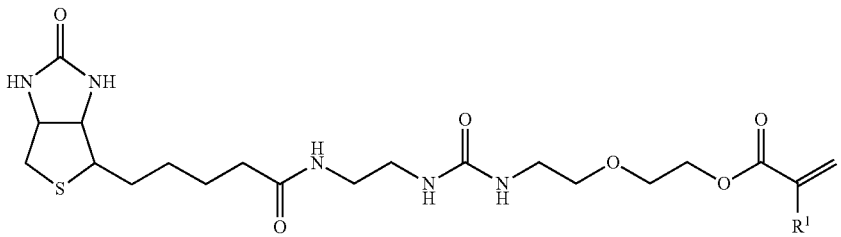

Embodiment 1B is an article comprising a substrate and a polymeric material disposed on a substrate. The polymeric material contains monomeric units derived from the biotin-containing monomer of Formula (I)

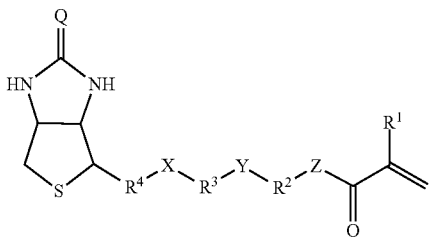

(I)

in an amount ranging from 1 to 100 mole percent based on total moles of monomeric units in the polymeric material. In Formula (I), group Q is oxygen or NH, group X is —(CO)—O— or —(CO)—NH—, group Y is —NH—(CO)—, —NH—(CO)—NH—, —O—(CO)—NH—, or —O—(CO)—, and group Z is —O— or —NH—. Group $R^1$ is hydrogen or methyl and group $R^2$ is an alkylene, an alkylene substituted with an aryl, or a heteroalkylene. Each group $R^3$ and $R^4$ is independently a (hetero)alkylene.

Embodiment 2B is the article of embodiment 1B, wherein the substrate is porous.

Embodiment 3B is the article of embodiment 1B or 2B, wherein the polymeric material is irreversibly attached to the substrate.

Embodiment 4B is the article of any one of embodiment 1B to 3B, wherein the polymeric material is grafted to a surface of the substrate.

Embodiment 5B is the article of any one of embodiments 1B to 4B, wherein the polymeric material is according to any one of embodiments 2A to 10A.

Embodiment 6B is the article of any one of embodiments 1B to 5B, wherein the substrate is a membrane and the article is flexible.

Embodiment 1C is a method of making an article. The method includes providing a substrate and forming a polymerizable composition comprising a monomer of Formula (I)

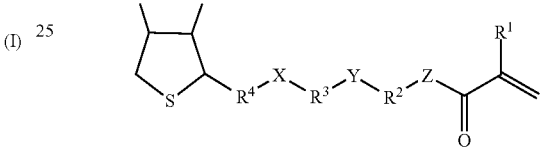

(I)

in an amount ranging from 1 to 100 mole percent based on total moles of monomeric units in the polymerizable composition. In Formula (I), group Q is oxygen or NH, group X is —(CO)—O— or —(CO)—NH—, group Y is —NH—(CO)—, —NH—(CO)—NH—, —O—(CO)—NH—, or —O—(CO)—, and group Z is —O— or —NH—. Group $R^1$ is hydrogen or methyl and group $R^2$ is an alkylene, an alkylene substituted with an aryl, or a heteroalkylene. Each group R and $R^4$ is independently a (hetero)alkylene. The method further includes contacting the substrate with the polymerizable composition and polymerizing the polymerizable composition to form a polymeric material. In many embodiments, the polymerizing step results in irreversible attachment of the polymeric material to the substrate.

Embodiment 2C is the method of embodiment 1C, wherein the polymerizing step results in the irreversible attachment of the polymeric material to the substrate.

Embodiment 3C is the method of embodiment 1C or 2C, wherein the polymerizing step results in grafting of the polymeric material to the substrate.

Embodiment 4C is the method of any one of embodiments 1C to 3C, wherein the substrate is porous.

Embodiment 5C is the method of any one of embodiment 1C to 4C, wherein the substrate is poly(ether sulfone).

Embodiment 6C is the method of any one of embodiments 1C to 5C, wherein the polymerizable composition comprises a solvent that is water or a water/water-miscible organic solvent mixture with a volume ratio of the water to the water-miscible organic solvent being greater than 1:1.

Embodiment 7C is the method of any one of embodiments 1C to 6C, wherein the monomer of Formula (I) is of Formula (I-B-1).

(I-B-1)

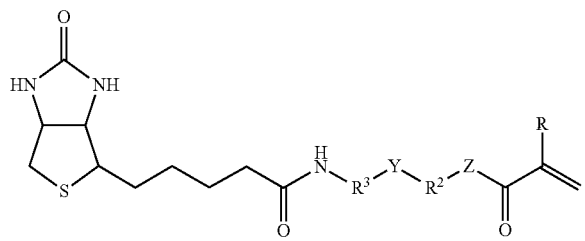

Embodiment 8C is the method of any one of embodiments 1C to 7C, wherein the monomer of Formula (I) is of Formula (I-C-3)

(I-C-3)

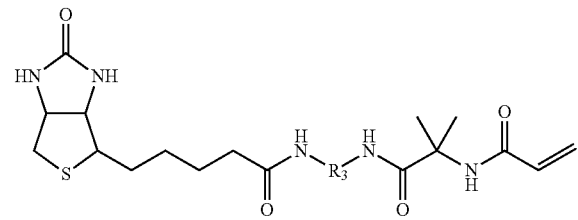

Embodiment 9C is the method of any one of embodiments 1C to 7C, wherein the monomer of Formula (I) is of Formula (I-D-1) or (I-D-2).

(I-D-1)

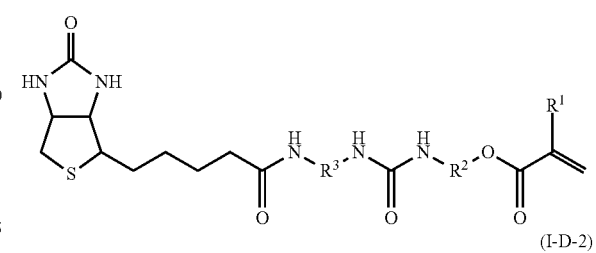

(I-D-2)

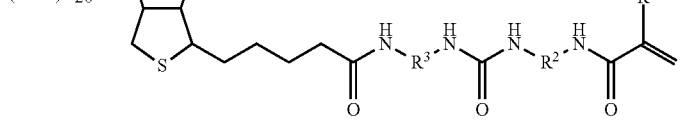

Embodiment 10C is the method of embodiment 9C, wherein the monomer of Formula (I) is of Formula (I-D-1).

Embodiment 11C is the method of embodiment 10C, wherein the monomer of Formula (I-D-1) is of Formula (I-D-3), Formula (I-D-4), or Formula (I-D-5).

(I-D-3)

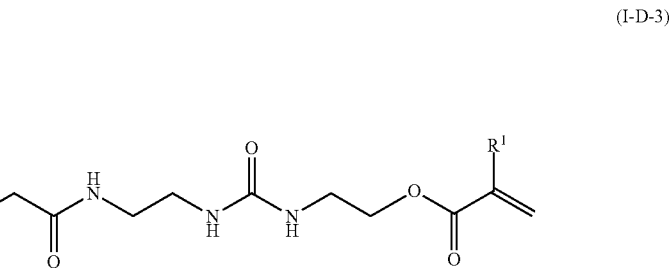

(I-D-4)

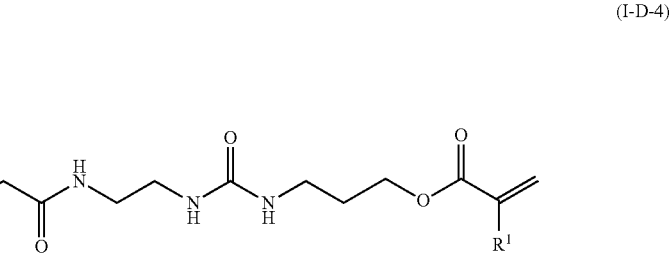

(I-D-5)

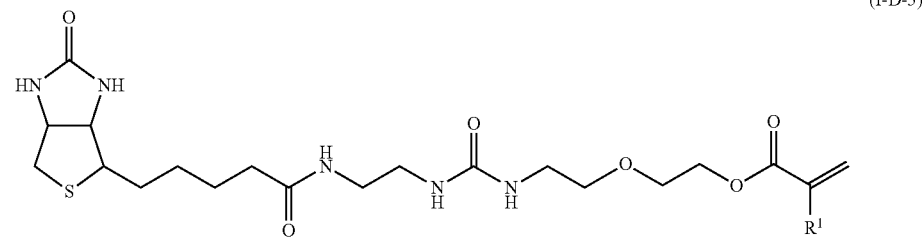

Embodiment 12C is the method of any one of embodiments 1C to 11C, wherein the substrate is a membrane and the article is flexible.

Embodiment 1D is a method of separating biotin-binding proteins from other proteins. The method includes providing an article as described in Embodiment 1B. The method still further includes exposing the article to a mixture comprising biotin-binding proteins and non-biotin-binding biomaterials. The method includes binding the biotin-binding proteins to the article.

Embodiment 1E is biotin-containing monomer of Formula (I) is provided.

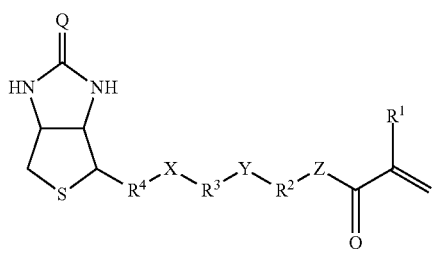

(I)

In Formula (I), group Q is oxygen or NH, group X is —(CO)—O— or —(CO)—NH—, group Y is —NH—(CO)—, —NH—(CO)—NH—, —O—(CO)—NH—, or —O—(CO)—, and group Z is —O—. Group $R^1$ is hydrogen or methyl and group $R^2$ is an alkylene, an alkylene substituted with an aryl, or a heteroalkylene. Each group $R^3$ and $R^4$ is independently a (hetero)alkylene. If Y is equal to —NH—(CO)—, then $R^2$ has greater than 2 carbon atoms.

Embodiment 2E is the monomer of embodiment 1E, wherein the monomer of Formula (I) is of Formula (I-D-1).

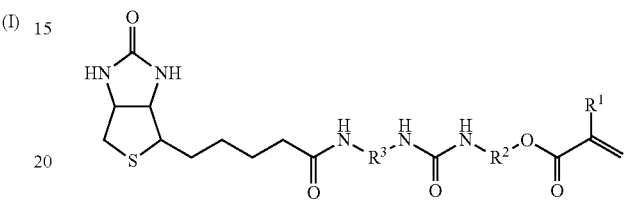

(I-D-1)

Embodiment 3E is the monomer of embodiment 2E, wherein the monomer of Formula (I) is of Formula (I-D-3), Formula (I-D-4), or Formula (I-D-5).

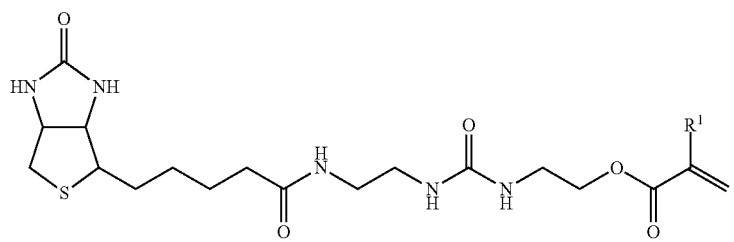

(I-D-3)

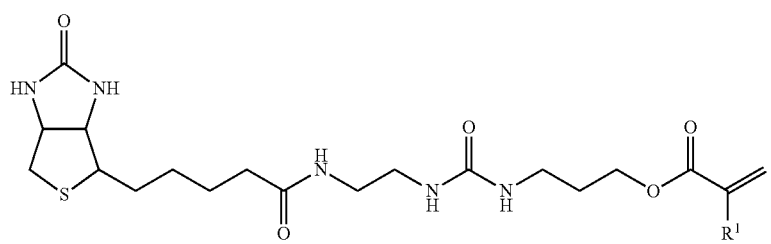

(I-D-4)

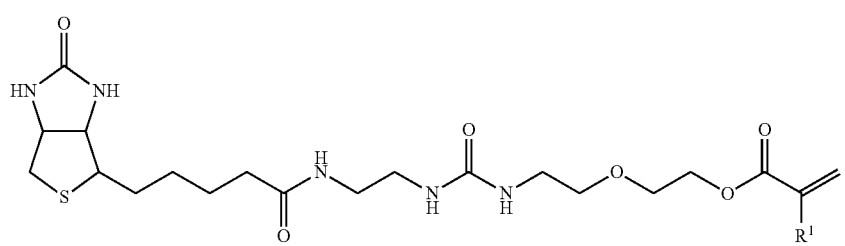

(I-D-5)

EXAMPLES

Materials

Biotin was obtained from the A.S. Joshi Company, Mumbai, India.

4,4-Dimethyl-2-vinyl-4H-oxazol-5-one (vinyldimethylazlactone, VDM, CAS #29513-26-6) was obtained from SNPE Incorporated, Princeton, NJ.

2-Isocyanatoethylmethacrylate (IEM) was obtained from Showa Denko, Fukushima, Japan, as Karenz MOI.

2-Isocyanatoethylacrylate (IEA) was obtained from Showa Denko, Fukushima, Japan, as Karenz AOI.

2-(2-Isocyanatoethoxy)ethylmethacrylate (IEM-EG) was obtained from Showa Denko, Fukushima, Japan, as Karenz MOI-EG.

4-(3-Sulfopropyloxy)benzophenone, sodium salt (S-BP) photoinitiator was prepared as described in U.S. Pat. No. 10,039,856 (Rasmussen et al.).

Biotin methyl ester was prepared as described by Sundberg, S. A., et al, *Journal of the American Chemical Society*, 1995, 117, 12050-12057.

N-(2-Aminoethyl)biotinamide was prepared from biotin methyl ester and ethylenediamine as described in Tao, L., et al., *Chemical Communications*, 2007, 3441-3443.

Dimethylacrylamide (DMA), acrylamide, 2-hydroxyethylmethacrylate (HEMA) and benzoquinone were obtained from Sigma-Aldrich, Milwaukee, WI, and used as received.

Monomer Preparation

Monomer Example 1 (Monomer A): N-(2-(2-Acrylamido-2-methylpropanamido)ethyl)-5-(2-oxohexahydro-1H-thieno[3,4-d]imidazol-4-yl)pentanamide

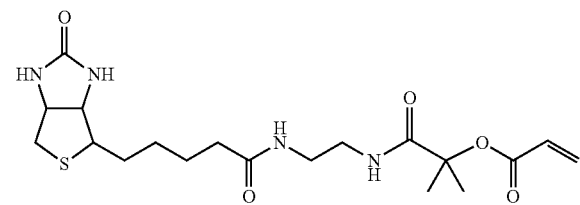 [SMILES: C=CC(=O)OC(C)(C)C(=O)NCCNC(=O)CCCCC1SCC2NC(=O)NC21]

N-(2-aminoethyl)biotinamide (2.70 grams) was dissolved in deionized water (13.3 mL) with magnetic stirring. The stirred mixture was cooled in an ice-water bath for 5 minutes. 4,4-Dimethyl-2-vinyl-4H-oxazol-5-one (VDM) (1.39 g) was added by syringe. Stirring was continued for 30 minutes and then the reaction mixture was removed from the ice bath. Analysis of the reaction by $^1$H NMR confirmed formation of Monomer A (23.5 weight % aqueous solution). $^1$H-NMR (500 MHz, D$_2$O) δ 1.24 & 1.28 (m & s, 8H), 1.44 (m, 4H), 2.06 (t, 2H), 2.59 (d, 1H), 2.81 (dd, 1H), 3.14 (m, 4H), 4.23 (m, 1H) 4.42 (m, 1H), 5.58 (m, 1H), 6.01 (m, 1H), 6.09 (m, 1H).

Monomer Preparatory Example 1 (Monomer B):
N-(1-((2-hydroxyethyl)amino)-2-methyl-1-oxopropan-2-yl)acrylamide

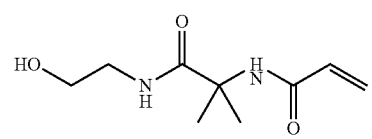

4,4-Dimethyl-2-vinyl-4H-oxazol-5-one (vinyldimethylazlactone (VDM) (58.38 g, 0.42 mole) was dissolved in t-butyl methyl ether (250 mL) in a round bottomed flask equipped with an overhead stirrer. Ethanolamine (24.4 g, 0.4 mole) was added dropwise to the stirring solution. The reaction product separated as a colorless solid and was isolated by filtration. Recrystallization from acetone provided Monomer B. $^1$H-NMR (500 MHz, D$_2$O) δ 1.29 (s, 6H), 3.14 (t, 2H), 3.43 (t, 2H), 5.57 (d, 1H), 6.01 (d, 1H), 6.08 (dd, 1H). A 10-weight percent solution in deionized water was prepared for use in coating experiments.

Monomer Example 2 (Monomer C): Preparation of 2-(3-(2-(5-(2-Oxohexahydro-1H-thieno[3,4-d]imidazol-4-yl)pentanamido)ethyl)ureido)ethyl methacrylate

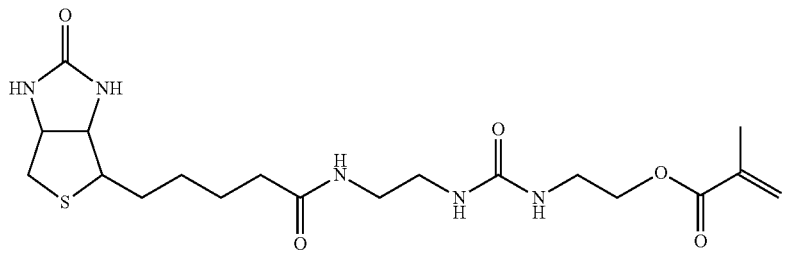 [SMILES: C=C(C)C(=O)OCCNC(=O)NCCNC(=O)CCCCC1SCC2NC(=O)NC21]

The procedure of Monomer A preparation can be repeated, with the exception that 2-isocayanatoethylmethacrylate (IEM) is used instead of VDM, to prepare Monomer C. An aqueous solution of Monomer C can be used to prepare functionalized membranes according to the general procedures of Examples 1-7.

Monomer Example 3 (Monomer D): 2-(3-(2-(5-(2-Oxohexahydro-1H-thieno[3,4-d]imidazol-4-yl)pentanamido)ethyl)ureido)ethyl acrylate

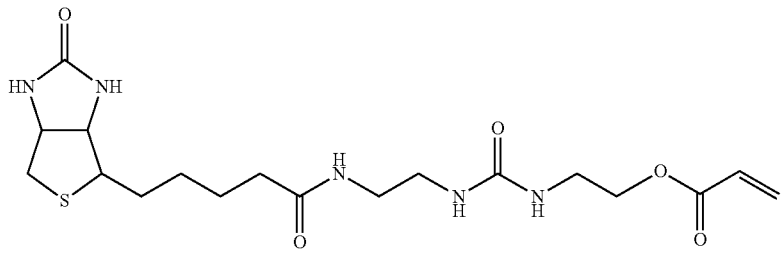 [SMILES: C=CC(=O)OCCNC(=O)NCCNC(=O)CCCCC1SCC2NC(=O)NC21]

The procedure of Monomer A can be repeated, with the exception that 2-isocyanatoethylacrylate (IEA) is used instead of VDM, to prepare Monomer D. An aqueous solution of Monomer D can be used to prepare functionalized membranes according to the general procedures of Examples 1-7.

Monomer Example 4 (Monomer E): 7,12-dioxo-16-(2-oxohexahydro-1H-thieno[3,4-d]imidazol-4-yl)-3-oxa-6,8,11-triazahexadecyl methacrylate

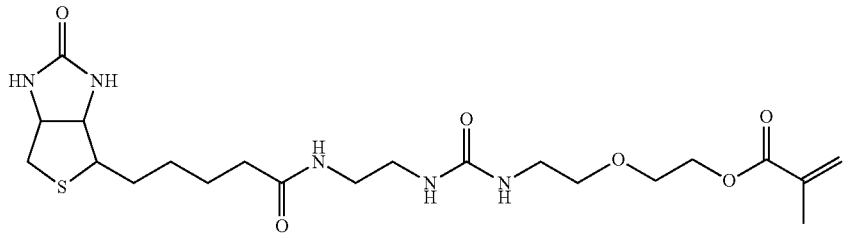 [SMILES: C=C(C)C(=O)OCCOCCNC(=O)NCCNC(=O)CCCCC1SCC2NC(=O)NC21]

The procedure used to prepare Monomer A can be repeated, with the exception that 2-(2-isocyanatoethoxy)ethyl methacrylate (IEM-EG) is used instead of VDM, to prepare Monomer E. An aqueous solution of Monomer E can be used to prepare functionalized membranes according to the general procedures of Examples 1-7.

Article Preparation

Example 1A to 1E: Preparation of Biotin-Functionalized Nylon Membranes from Polymerizable Composition Containing Monomer A and DMA Coating solutions (of 5 g total mass) were prepared in deionized water containing 4-(3-sulfopropyloxy)benzophenone, sodium salt (S-BP) photoinitiator (125 microliters of a 0.10 g/mL solution in deionized water) with varying molar ratios of Monomer A and dimethylacrylamide (DMA) monomer as shown in Table 1 for Examples 1A to 1E. The total monomer concentration of each coating solution was 0.75 M.

For each coating solution, a polyamide membrane (9 cm×12 cm, nylon 66, single reinforced layer three-zone membrane, nominal pore size 1.8 micrometers, #080ZN, obtained from 3M Separation and Purification Science Division, Meridan, CT) was placed on a sheet of clear, polyester film (about 0.25 mm thick), and approximately 4.5 mL of coating solution was pipetted onto the top surface of the membrane. The coating solution soaked into the membrane for about 1 minute, and then a second sheet of polyester film was placed on top of the substrate. A 2.28 kg cylindrical weight was rolled over the top of the resulting three-layer sandwich to squeeze out excess coating solution. Ultraviolet (UV)-initiated grafting was conducted by irradiating the sandwich using a UV stand (Classic Manufacturing, Inc., Oakdale, MN) equipped with 18 bulbs [Sylvania RG2 40W F40/350BL/ECO, 10 above and 8 below the membrane, 1.17 meters (46 inches) long, spaced 5.1 cm (2 inches) on center] and an irradiation time of 15 minutes. The sandwiched membrane was placed on a glass plate with a bulb to membrane distance of 3.5 cm during the irradiation. At the end of the irradiation time, the polyester sheets were removed, and the resulting functionalized membrane was placed in a 250 mL polyethylene bottle. The bottle was filled with deionized water, sealed, and shaken for 30 minutes to wash off any residual monomer or nongrafted polymer. The water was poured off, the functionalized membrane was washed for another 30 minutes with fresh deionized water, and then washed a third time with deionized water and allowed to dry.

The functionalized membranes were flexible, and were easily manipulated (such as, e.g., die-punched or folded) without damage. Individual disks (12 mm diameter) were die-punched from each sheet of functionalized membrane. The disks were analyzed for static binding capacity by incubating each disk in a solution of 1 mg/mL avidin (Millipore Sigma, St. Louis, MO) in HEPES buffer (50 mM, pH 7.5). Each disk was placed in a 1.5 mL centrifuge tube with 1.0 mL of the avidin solution. The tubes were capped and tumbled overnight (typically 14 hours) on a rotating mixer. The resulting supernatant solutions were analyzed using an AGILENT 8453 ultraviolet-visible spectrophotometer (Agilent Technologies, Santa Clara, CA) at 280 nm (blanked against the buffer with no avidin and with a background correction applied at 325 nm). The UV absorbance of each supernatant solution was compared to the absorbance measured prior to contact with the disk to determine the static binding capacity of the functionalized membrane for avidin. Avidin concentrations in the supernatant and starting solutions were calculated based on the absorbance value measured for a 1 mg/mL avidin standard solution. In Table 1, the static binding capacities are reported in mg/mL (mg of avidin bound/mL of membrane volume). Membrane volume was calculated based on the measured membrane thickness and the diameter of the disk tested.

TABLE 1

| Example | Monomer A/DMA Ratio (mol/mol) | Static Binding Capacity of Biotin-Functionalized Nylon Membrane (mg/mL) |
| --- | --- | --- |
| 1A | 2.5/97.5 | 11.4 |
| 1B | 5/95 | 10.4 |
| 1C | 10/90 | 10.3 |
| 1D | 20/80 | 10.2 |
| 1E | 30/70 | 7.6 |

Example 2: Static Binding Capacity

Example 1A was repeated using 10 individual membranes prepared with the same coating solution having a Monomer A/DMA Ratio (mol/mol) of 2.5/97.5, with the exception that twice as much photoinitiator solution was used. The functionalized membrane was flexible. The mean (n=10) Static Binding Capacity was determined to be 16.96±0.78 mg/mL.

Example 3A to 3D: Preparation of Biotin-Functionalized Nylon Membranes from Polymerizable Composition Containing Monomer A and Acrylamide (Monomer Concentration 0.75 M)

Biotin-functionalized membranes were prepared and analyzed according to the procedures described in Example 1 with the exception that acrylamide was used instead of DMA as the co-monomer in the coating solution. The functionalized membranes were flexible. The static binding capacities of the biotin-functionalized membranes for avidin are reported in Table 2 for Examples 3A to 3D.

TABLE 2

| Example | Monomer A/Acrylamide Ratio (mol/mol) | Static Binding Capacity of Biotin-Functionalized Nylon Membrane (mg/mL) |
| --- | --- | --- |
| 3A | 2.5/97.5 | 16.2 |
| 3B | 5/95 | 18.1 |
| 3C | 10/90 | 19.3 |
| 3D | 20/80 | 18.4 |

Example 4: Preparation of Biotin-Functionalized Nylon Membranes from Polymerizable Composition Containing Monomer A and Acrylamide (Monomer Concentration 0.5 M)

Coating solutions (of 5 g total mass) were prepared in deionized water containing 4-(3-sulfopropyloxy)benzophenone, sodium salt (S-BP) photoinitiator (3.9 microliters of a 0.05 g/mL solution in deionized water) with varying molar ratios of Monomer A and acrylamide monomer. The total monomer concentration of each coating solution was 0.5 M. Functionalized membranes were prepared and analyzed according to the procedures described in Example 1. The functionalized membranes were flexible. The static binding capacities of the functionalized membranes for avidin are reported in Table 3 for Examples 4A to 4D.

TABLE 3

| Example | Monomer A/Acrylamide Ratio (mol/mol) | Static Binding Capacity of Biotin-Functionalized Nylon Membrane (mg/mL) |
| --- | --- | --- |
| 4A | 2.5/97.5 | 10.5 |
| 4B | 5/95 | 11.6 |
| 4C | 10/90 | 13.7 |
| 4D | 20/80 | 16.9 |

Example 5: Preparation of Biotin-Functionalized PES Membrane with Polymerizable Composition Containing Monomer A and Acrylamide Coating solutions (of 5 g total mass) were prepared in deionized water containing varying molar ratios of Monomer A and acrylamide monomer. The total monomer concentration of each coating solution was 0.5 M.

For each coating solution, a poly(ether sulfone) (PES) membrane (9 cm×12 cm, MicroPES 8F flat sheet, nominal pore size 0.8 micrometers, obtained from 3M Separation and Purification Science Division, Meridan, CT) was placed on a sheet of clear, polyester film (about 0.25 mm thick), and approximately 4.5 mL of coating solution was pipetted onto the top surface of the membrane. The coating solution soaked into the membrane for about 1 minute, and then a second sheet of polyester film was placed on top of the substrate. A 2.28 kg cylindrical weight was rolled over the top of the resulting three-layer sandwich to squeeze out excess coating solution. Ultraviolet (UV)-initiated grafting was conducted by irradiating the sandwich using a UV stand (Classic Manufacturing, Inc., Oakdale, MN) equipped with 18 bulbs [Sylvania RG2 40W F40/350BL/ECO, 10 above and 8 below the membrane, 1.17 meters (46 inches) long, spaced 5.1 cm (2 inches) on center] and an irradiation time of 15 minutes. The sandwiched membrane was placed on a glass plate with a bulb to membrane distance of 3.5 cm during the irradiation. At the end of the irradiation time, the polyester sheets were removed and the resulting functionalized membrane was placed in a 250 mL polyethylene bottle. The bottle was filled with deionized water, sealed, and shaken for 30 minutes to wash off any residual monomer or nongrafted polymer. The water was poured off, the functionalized membrane was washed for another 30 minutes with fresh deionized water, and then washed a third time with deionized water and allowed to dry.

Functionalized membranes were prepared into disks and analyzed according to the procedures described in Example 1. The functionalized membranes were flexible. The static binding capacities of the functionalized membranes for avidin are reported in Table 4 for Examples 5A to 5F.

TABLE 4

| Example | Monomer A/Acrylamide Ratio (mol/mol) | Static Binding Capacity of Biotin-Functionalized PES Membrane (mg/mL) |
|---|---|---|
| 5A | 2.5/97.5 | 35.4 |
| 5B | 5/95 | 33.8 |
| 5C | 10/90 | 37.0 |
| 5D | 15/85 | 36.8 |
| 5E | 20/80 | 32.9 |
| 5F | 25/75 | 31.4 |

Example 6: Preparation of Biotin-Functionalized Nylon Membrane with Monomer A and HEMA Functionalized membranes were prepared and analyzed according to the procedures described in Example 1 with the exception that 2-hydroxyethylmethacrylate (HEMA) was used instead of DMA as the co-monomer in the coating solution. The functionalized membranes were flexible. The static binding capacities of the functionalized membranes for avidin are reported in Table 5 for Examples 6A to 6D.

TABLE 5

| Example | Monomer A/HEMA Ratio (mol/mol) | Static Binding Capacity of Functionalized Nylon Membrane (mg/mL) |
|---|---|---|
| 6A | 2.5/97.5 | 3.8 |
| 6B | 5/95 | 4.5 |
| 6C | 10/90 | 5.2 |
| 6D | 20/80 | 4.9 |

Example 7: Preparation of Biotin-Functionalized PES Membrane with Monomer A and Monomer B Functionalized membranes were prepared and analyzed according to the procedures described in Example 5 with the exception that Monomer B was used instead of acrylamide as the co-monomer in the coating solution, and the total monomer concentration of each coating solution was 0.35 M. The functionalized membranes were flexible. The static binding capacities of the functionalized membranes for avidin are reported in Table 6 for Example 7A to 7F.

TABLE 6

| Example | Monomer A/Monomer B Ratio (mol/mol) | Static Binding Capacity of Biotin-Functionalized PES Membrane (mg/mL) |
|---|---|---|
| 7A | 2.5/97.5 | 22.3 |
| 7B | 5/95 | 26.9 |
| 7C | 10/90 | 29.5 |
| 7D | 15/85 | 28.2 |
| 7E | 20/80 | 25.9 |
| 7F | 25/75 | 29.3 |

Figure 1B:
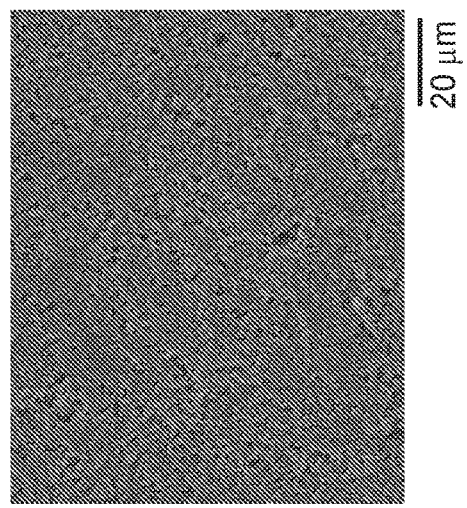
FIG. 1B is a scanning electron micrograph of the article of Comparative Example 1 prepared using the membrane of FIG. 1A.

Comparative Example 1: Polymerizable Solution Containing Biotin Monomer and DMA in Dioxane A coating solution (10 g total mass) was prepared in dioxane containing 0.1 weight percent Monomer A, 10 weight percent dimethylacrylamide (DMA) monomer, and 25 ppm benzoquinone, as described in Example 10 of WO2020/127311 (Kyhse-Andersen et al.). The solution contained 1 weight percent Monomer A and 99 weight percent DMA based on total weight of monomers. This solution was coated onto a MicroPES 8F membrane and UV irradiated for 10 minutes as described in Example 5 above. Following irradiation, the membrane was washed with dioxane, then washed three times with deionized water (30 minutes for each wash), and air dried as described in Example 5. Upon drying, the membrane shrank and curled up to about half of its original size and became extremely brittle (i.e., the membrane was not flexible). When a disk was cut to conduct the avidin binding assay, it shattered into three pieces. The disk exhibited negligible avidin binding capacity when tested as described in Example 1. The unmodified substrate is shown in FIG. 1A while the final article is shown in FIG. 1B.

Figure 1C:
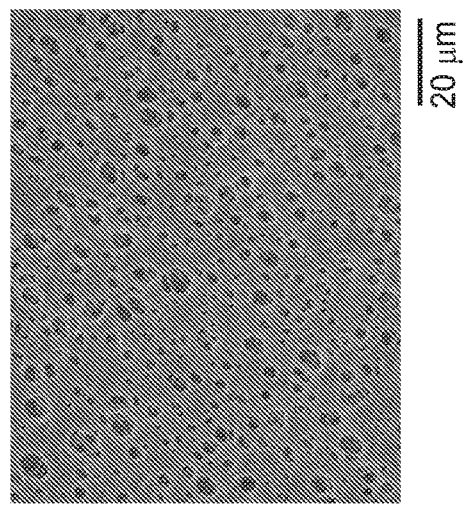
FIG. 1C is a scanning electron micrograph of the article of Comparative Example 2 prepared using the membrane of FIG. 1A.

Comparative Example 2: Polymerizable Composition Containing Biotin Monomer and DMA in Water A coating solution (10 g total mass) was prepared in deionized water containing 0.1 weight percent Monomer A and 10 weight percent dimethylacrylamide (DMA) monomer. The solution contained 1 weight percent Monomer A and 99 weight percent DMA based on total weight of monomers. This solution was coated onto a MicroPES 8F membrane and UV irradiated for 10 minutes as described in Example 5. Following irradiation, the membrane was washed three times with DI water (30 minutes for each wash), and air dried as described in Example 5. Upon drying, the membrane appeared quite normal and was flexible. The membrane exhibited negligible avidin binding capacity when tested as described in Example 1. The unmodified substrate is shown in FIG. 1A while the final article is shown in FIG. 1C.

What is claimed is:

1. A polymeric material comprising monomeric units derived from a monomer of Formula (I)

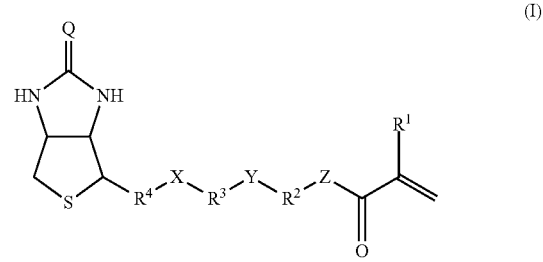

in an amount ranging from 1 to 100 mole percent based on total moles of monomeric units in the polymeric material,
wherein
Q is oxygen or NH;
X is —(CO)—O— or —(CO)—NH—
Y is —NH—(CO)—, —NH—(CO)—NH—, —O—(CO)—NH—, or —O—(CO)—;
Z is —O— or —NH—;
$R^1$ is hydrogen or methyl; and
$R^2$ is an alkylene, alkylene substituted with an aryl, or heteroalkylene, with the proviso that if the polymeric material is a homopolymer and Y is equal to —NH—(CO)—, then $R^2$ has greater than 2 carbon atoms; and
each $R^3$ and $R^4$ is each independently a (hetero) alkylene.

2. The polymeric material of claim 1, wherein the polymeric material comprises 1 to 99 mole percent monomeric units derived from the monomer of Formula (I) and 1 to 99 mole percent monomeric units derived from a hydrophilic second monomer having a single ethylenically unsaturated group and/or derived from a hydrophilic crosslinking monomer having a plurality of ethylenically unsaturated groups, wherein each amount is based on total moles of monomeric materials in the polymeric material.

3. The polymeric material of claim 2, wherein the polymeric material comprises 1 to 50 mole percent monomeric units derived from the monomer of Formula (I) and 50 to 99 mole percent monomeric units derived from the hydrophilic second monomer having a single ethylenically unsaturated group and/or derived from the hydrophilic crosslinking monomer having a plurality of ethylenically unsaturated groups, wherein each amount is based on total moles of monomeric material in the polymeric material.

4. The polymeric material of claim 1, wherein Z is —O—.

5. The polymeric material of claim 1, wherein the monomer of Formula (I) is of Formula (I-D-1)

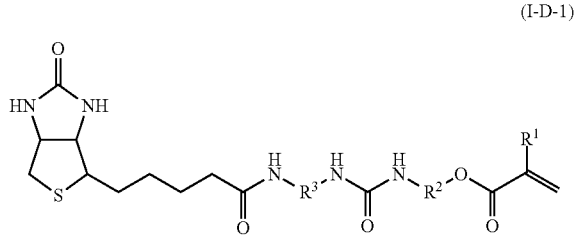

(I-D-1)

wherein
$R^2$ is an alkylene, alkylene substituted with an aryl, or heteroalkylene, with the proviso that if the polymeric material is a homopolymer and Y is equal to —NH—(CO)—, then $R^2$ has greater than 2 carbon atoms; and
$R^3$ is a (hetero) alkylene.

6. An article comprising:
a substrate; and
a polymeric material disposed on the substrate, the polymeric material comprising monomeric units derived from a monomer of Formula (I)

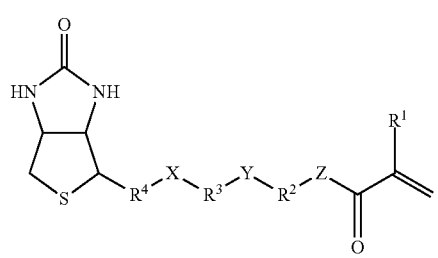

(I)

in an amount ranging from 1 to 100 mole percent based on total moles of monomeric units in the polymeric material, wherein
Q is oxygen or NH;
X is —(CO)—O— or —(CO)—NH—

Y is —NH—(CO)—, —NH—(CO)—NH—, —O—(CO)—NH—, or —O—(CO)—;

Z is —O— or —NH—;

$R^1$ is hydrogen or methyl;

$R^2$ is an alkylene, alkylene substituted with an aryl, or heteroalkylene; and each $R^3$ and $R^4$ is each independently a (hetero) alkylene.

7. The article of claim 6, wherein Z is —O—.

8. The article of claim 6, wherein the substrate is porous.

9. The article of claim 6, wherein the substrate is a membrane and wherein the membrane with the polymeric material disposed thereon is flexible.

10. The article of claim 6, wherein the polymeric material is irreversibly attached to the substrate.

11. The article of claim 6, wherein the polymeric material comprises 1 to 99 mole percent monomeric units derived from the monomer of Formula (I) and 1 to 99 mole percent monomeric units derived from a hydrophilic second monomer having a single ethylenically unsaturated group and/or derived from a hydrophilic crosslinking monomer having a plurality of ethylenically unsaturated groups, wherein each amount is based on total moles of monomeric material in the polymeric material.

12. The article of claim 11, wherein the polymeric material comprises 1 to 50 mole percent monomeric units derived from the monomer of Formula (I) and 50 to 99 mole percent monomeric units derived from the hydrophilic second monomer having a single ethylenically unsaturated group and/or derived from the hydrophilic crosslinking monomer having a plurality of ethylenically unsaturated groups, wherein each amount is based on total moles of monomeric material in the polymeric material.

13. The article of claim 6, wherein the monomer of Formula (I) is of Formula (I-D-1)

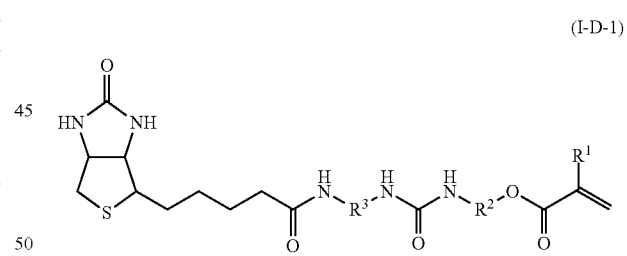

(I-D-1)

wherein
$R^2$ is an alkylene, alkylene substituted with an aryl, or heteroalkylene, with the proviso that if the polymeric material is a homopolymer and Y is equal to —NH—(CO)—, then $R^2$ has greater than 2 carbon atoms; and
$R^3$ is a (hetero) alkylene.

14. A method of separating biotin-binding proteins from other proteins, the method comprising:
providing an article according to claim 6;
exposing the article to a mixture comprising biotin-binding proteins and non-biotin-binding biomaterials; and
binding the biotin-binding proteins to the article.

15. A monomer of Formula (I)

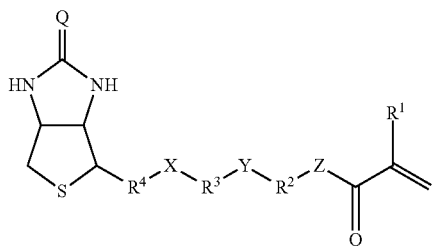

(I)

wherein
Q is oxygen or NH;
X is —(CO)—O— or —(CO)—NH—
Y is —NH—(CO)—, —NH—(CO)—NH—, —O—(CO)—NH—, or —O—(CO)—;
Z is —O—;
$R^1$ is hydrogen or methyl;

$R^2$ is an alkylene, alkylene substituted with an aryl, or heteroalkylene with the proviso that if Y is —NH—(CO)—, then $R^2$ has greater than 2 carbon atoms; and
each $R^3$ and $R^4$ is each independently a (hetero) alkylene.

16. The monomer of claim 15, wherein the monomer of Formula (I) is of Formula (I-D-1).

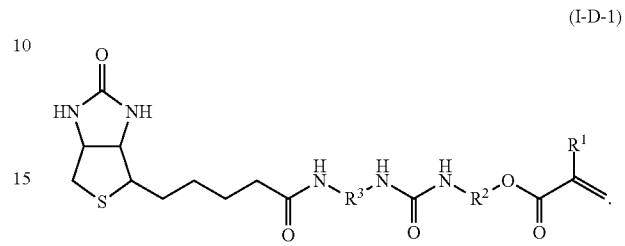

(I-D-1)

17. The monomer of claim 16, wherein the monomer of Formula (I-D-1) is of Formula (I-D-3), Formula (I-D-4), or Formula (I-D-5)

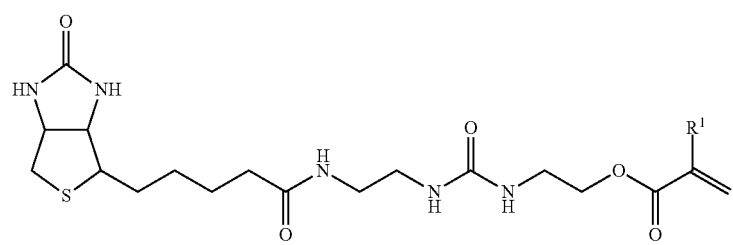

(I-D-3)

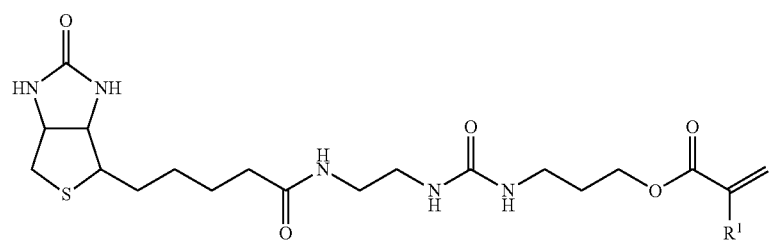

(I-D-4)

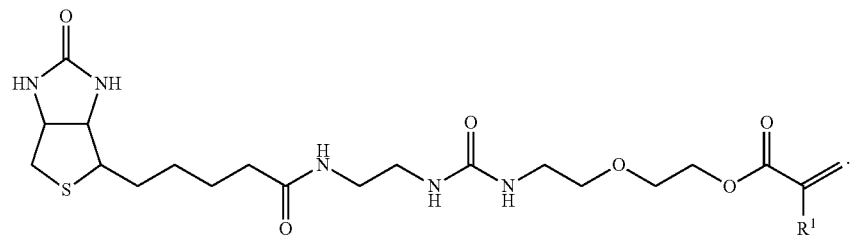

(I-D-5)

* * * * *